US008209042B2

(12) United States Patent
Yamamoto

(10) Patent No.: US 8,209,042 B2
(45) Date of Patent: Jun. 26, 2012

(54) SERVER DEVICE, INFORMATION PROCESSING METHOD AND PROGRAM

(75) Inventor: Satoko Yamamoto, Hokkaido (JP)

(73) Assignee: Tokyo Electron Limited, Tokyo (JP)

( * ) Notice: Subject to any disclaimer, the term of this patent is extended or adjusted under 35 U.S.C. 154(b) by 492 days.

(21) Appl. No.: 12/513,414

(22) PCT Filed: Oct. 31, 2007

(86) PCT No.: PCT/JP2007/071227

§ 371 (c)(1), (2), (4) Date: May 4, 2009

(87) PCT Pub. No.: WO2008/056583

PCT Pub. Date: May 15, 2008

(65) Prior Publication Data

US 2010/0106279 A1 Apr. 29, 2010

(30) Foreign Application Priority Data

Nov. 6, 2006 (JP) ................................ 2006-300702

(51) Int. Cl.
*G06F 19/00* (2006.01)

(52) U.S. Cl. .......................... 700/96; 700/121; 700/105

(58) Field of Classification Search .................. 700/121, 700/96, 105; 438/14

See application file for complete search history.

(56) References Cited

U.S. PATENT DOCUMENTS 6,165,805 A * 12/2000 Steffan et al. .................. 438/14
6,694,210 B1 * 2/2004 Toh .............................. 700/121
6,735,493 B1 * 5/2004 Chou et al. .................... 700/121
6,907,308 B1 * 6/2005 Bartlett et al. ................ 700/121
7,235,782 B2 * 6/2007 Takane et al. ................. 250/310
7,283,882 B1 * 10/2007 Bransky et al. ................ 700/96

FOREIGN PATENT DOCUMENTS

JP 07-297257 A 11/1995
JP 1019990074696 A 10/1999
JP 11-345751 A 12/1999
JP 2001-189248 A 7/2001
JP 2002-025997 A 1/2002
JP 2002-050555 A 2/2002
JP 2006-073845 A 3/2006

OTHER PUBLICATIONS

Korean Office action for 10-2009-7009538 dated Feb. 15, 2011.
International Search Report for PCT/JP2007/071227 dated Feb. 5, 2008.

* cited by examiner

*Primary Examiner* — Albert Decady
*Assistant Examiner* — Steven Garland
(74) *Attorney, Agent, or Firm* — Pearne & Gordon LLP

(57) ABSTRACT

A server device includes: a recipe storage unit for storing therein at least a recipe used in a manufacturing apparatus; a recipe receiving unit for receiving a modified recipe in case a content of the recipe in the manufacturing apparatus is modified; a recipe accumulation unit for accumulating the recipe received by the recipe receiving unit in the recipe storage unit; a modification information composition unit for composing modification information related to a modification of the content of the recipe; a transmission destination information storage unit for storing therein transmission destination information indicating a transmission destination of the modification information; a transmission destination information acquisition unit for acquiring the transmission destination information from the transmission destination information storage unit; and a modification information transmitting unit for transmitting the modification information to the transmission destination indicated by the transmission destination information.

27 Claims, 16 Drawing Sheets

CLIENT DEVICE 10
12 MODIFICATION INSTRUCTION TRANSMITTING UNIT
13 MODIFICATION INFORMATION RECEIVING UNIT
11 INPUT RECEIVING UNIT
14 MODIFICATION INFORMATION OUTPUT UNIT
INPUT DEVICE
DISPLAY

FIG. 10

| RECIPE IDENTIFICATION INFORMATION : R001 | | | RECIPE VERSION : 112 | |
|---|---|---|---|---|
| UPDATE: AVAILABLE | | | | |
| UPDATE AUTHORITY LEVEL : 3 | | | | |
| | STEP 1 | STEP 2 | STEP 3 | ---- |
| PROCESSING TIME | T1 | T20 | T3 | ---- |
| PROCESSING GAS | A | A | C | ---- |
| ⋮ | ⋮ | ⋮ | ⋮ | |

HEADER

BODY

RECIPE

FIG. 12

| APPARATUS IDENTIFICATION INFORMATION | RECIPE IDENTIFICATION INFORMATION | RECIPE VERSION | MODIFICATION DATE AND TIME |
|---|---|---|---|
| D001 | R001 | 112 | 2006/9/15 11:00 |
| | R001 | 111 | 2006/6/1 10:00 |
| | ----- | ----- | ----- |
| D002 | R005 | 015 | 2006/7/7 9:00 |
| | --- | --- | --- |
| --- | --- | --- | --- |

RECIPE MANAGEMENT INFORMATION

FIG. 13

| RECIPE IDENTIFICATION INFORMATION FOR TRANSMITTING MODIFICATION INFORMATION |
|---|
| R001 |
| R007 |
| ⋮ |

FIG. 14

NOTICE OF RECIPE MODIFICATION

A RECIPE OF RECIPE IDENTIFICATION INFORMATION 「R001」 IN A MANUFACTURING APPARATUS OF APPARATUS IDENTIFICATION INFORMATION 「D001」 WAS MODIFIED.

MODIFIED RECIPE IS AS FOLLOWS.

*FIG. 15*

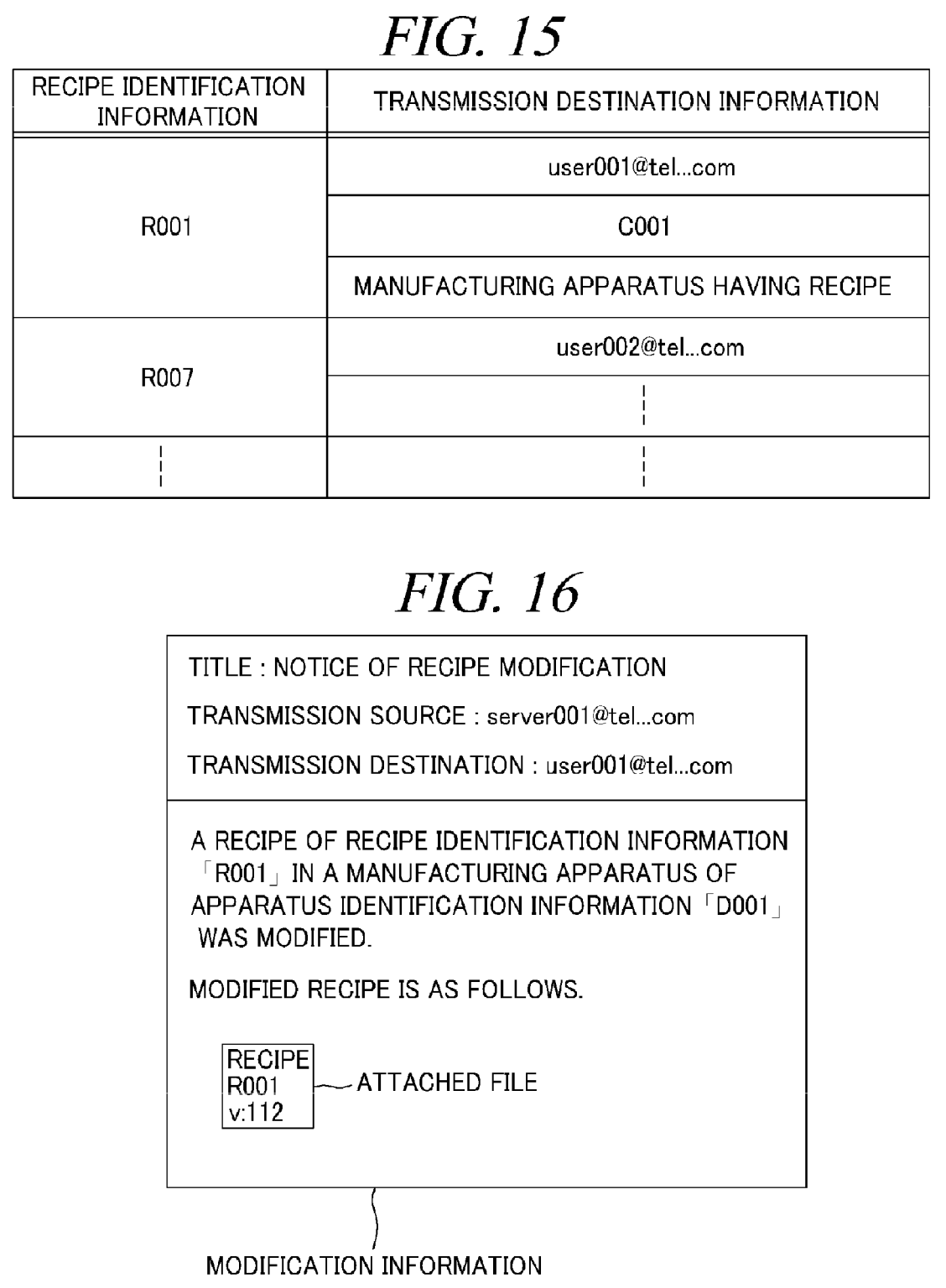

| RECIPE IDENTIFICATION INFORMATION | TRANSMISSION DESTINATION INFORMATION |
|---|---|
| R001 | user001@tel...com |
| | C001 |
| | MANUFACTURING APPARATUS HAVING RECIPE |
| R007 | user002@tel...com |
| | ⋮ |
| ⋮ | ⋮ |

*FIG. 16*

TITLE : NOTICE OF RECIPE MODIFICATION

TRANSMISSION SOURCE : server001@tel...com

TRANSMISSION DESTINATION : user001@tel...com

A RECIPE OF RECIPE IDENTIFICATION INFORMATION 「R001」 IN A MANUFACTURING APPARATUS OF APPARATUS IDENTIFICATION INFORMATION 「D001」 WAS MODIFIED.

MODIFIED RECIPE IS AS FOLLOWS.

RECIPE
R001
v:112

ATTACHED FILE

MODIFICATION INFORMATION

| APPARATUS IDENTIFICATION INFORMATION | ADDRESS |
| --- | --- |
| C001 | 192. 168. 1. 101 |
| ⋮ | ⋮ |
| D001 | 192. 168. 1. 11 |
| ⋮ | ⋮ |

| APPARATUS IDENTIFICATION INFORMATION | TRANSMISSION DESTINATION INFORMATION |
| --- | --- |
| D001 | D001 |
| | user001@tel...com |
| | ⋮ |
| ⋮ | ⋮ |

FIG. 20

| APPARATUS IDENTIFICATION INFORMATION | RECIPE IDENTIFICATION INFORMATION | TRANSMISSION DESTINATION INFORMATION |
|---|---|---|
| D001 | R001 | D001 |
| | | user001@tel...com |
| | D007 | D001 |
| | | C001 |
| D002 | R001 | D002 |
| | | ⋮ |
| | ⋮ | ⋮ |
| ⋮ | ⋮ | ⋮ |

FIG. 21

TITLE : NOTICE OF RECIPE MODIFICATION

TRANSMISSION SOURCE : server001@tel...com

TRANSMISSION DESTINATION : user001@tel...com

A RECIPE OF RECIPE IDENTIFICATION INFORMATION 「R001」 IN A MANUFACTURING APPARATUS OF APPARATUS IDENTIFICATION INFORMATION 「D001」 WAS MODIFIED.

A DIFFERENCE BETWEEN RECIPES IS AS FOLLOWS.

STEP 2 PROCESSING TIME T2→T20
STEP 3 PROCESSING GAS B→C

MODIFICATION INFORMATION

SERVER DEVICE, INFORMATION PROCESSING METHOD AND PROGRAM

TECHNICAL FIELD

The present invention relates to a server device for transmitting modification information indicating a modification of a content of a recipe.

BACKGROUND ART

Conventionally, there has been known a group management system which includes one or more manufacturing apparatuses for performing a predetermined semiconductor process on a target substrate and a server device connected to the one or more manufacturing apparatuses. Further, in the group management system, the semiconductor process or the like has been performed by using a recipe.

Further, in the related art, there has been a recipe management method for matching recipes retained in both parties between a server device and one or more semiconductor manufacturing devices (for example, see Patent Document 1).

In addition, in the related art, there has been known a so-called batch type vertical heat treatment apparatus (for example, see Patent Documents 2 and 3).

Patent Document 1: Japanese Patent Laid-open Publication No.

Patent Document 2: Japanese Patent Publication No. 3543996

Patent Document 3: Japanese Patent Laid-open Publication No. 2002-25997

DISCLOSURE OF THE INVENTION

Problems to Be Solved by the Invention

By modifying a content of a recipe retained in a manufacturing apparatus, it is possible to modify, e.g., a process performed in the manufacturing apparatus. However, if a setup error occurs due to a careless modification of the process or the like, a "lot-out" of products or the like may occur.

The present invention has been conceived to solve the foregoing problem, and an object of the present invention is to provide a server device capable of calling attention to a modification in case a content of a recipe is modified.

Means for Solving the Problems

To solve the above-mentioned problems, a server device in accordance with the present invention is directed to a server device included in a group management system, which includes one or more manufacturing apparatuses for performing a predetermined semiconductor process on a target substrate and the server device connected with the one or more manufacturing apparatuses, the server device including: a recipe storage unit for storing therein at least a recipe used in the one or more manufacturing apparatuses; a recipe receiving unit for receiving a modified recipe if a content of the recipe of the manufacturing apparatus is modified; a recipe accumulation unit for accumulating the recipe received by the recipe receiving unit in the recipe storage unit; a modification information composition unit for composing modification information related to a modification of the content of the recipe; a transmission destination information storage unit for storing therein transmission destination information indicating a transmission destination of the modification information; a transmission destination information acquisition unit for acquiring the transmission destination information from the transmission destination information storage unit; and a modification information transmitting unit for transmitting the modification information composed by the modification information composition unit to the transmission destination indicated by the transmission destination information acquired by the transmission destination information acquisition unit.

With this configuration, if a content of a recipe is modified, it is possible to call attention to the modification, thereby preventing an occurrence of a lot-out or the like caused by a careless modification of the content of the recipe.

Further, in the server device in accordance with the present invention, the modification information composition unit may compose the modification information containing a purport of the modification of the content of the recipe.

With this configuration, it is possible to recognize a purport of the modification of the content of the recipe based on the modification information. As a result, for example, it is possible to recognize the modified content of the recipe by accessing the recipe of which the content is modified.

Furthermore, in the server device in accordance with the present invention, the modification information composition unit may compose the modification information including the modified recipe received by the recipe receiving unit.

With this configuration, it is possible to recognize a content of the modified recipe based on the modification information. As a result, it is not necessary to access the modified recipe, so that user convenience is enhanced.

Further, in the server device in accordance with the present invention, the modification information composition unit may obtain a difference between the non-modified recipe stored in the recipe storage unit and the modified recipe received by the recipe receiving unit and may compose the modification information including the difference.

With this configuration, it is possible to find the difference between a content of the non-modified recipe and that of the modified content based on the modification information. As a result, it is not necessary to access the modified recipe and also, it is possible to easily recognize which part of the content of the recipe has been modified based on the modification information, so that user convenience is enhanced.

Furthermore, in the server device in accordance with the present invention, the modification of the content of the recipe may be a modification of a content of information related to a setup of the manufacturing apparatus in the recipe.

Further, in the server device in accordance with the present invention, the modification of the content of the recipe may be a modification of a content of information related to a recipe management.

Further, a server device in accordance with the present invention relates to a server device included in a group management system, which includes one or more manufacturing apparatuses for performing a predetermined semiconductor process on a target substrate and the server device connected with the one or more manufacturing apparatuses, the server device including: a recipe storage unit for storing therein at least a recipe used in the one or more manufacturing apparatuses; a recipe receiving unit for receiving the recipe of the manufacturing apparatus; a recipe accumulation unit for accumulating the recipe received by the recipe receiving unit in the recipe storage unit; a modification information composition unit for composing modification information related to a modification of a content of the recipe; a transmission destination information storage unit for storing therein transmission destination information indicating a transmission destination of the modification information; a transmission destination information acquisition unit for acquiring the transmission destination information from the transmission destination information storage unit; a difference/sameness information acquisition unit for comparing a newest recipe received by the recipe receiving unit with a recipe, closest in time to the newest recipe, which is stored in the recipe storage unit and is a recipe of the manufacturing apparatus in which the newest recipe is used and acquiring difference/sameness information indicating whether the two recipes are different or not; and a modification information transmitting unit for transmitting the modification information composed by the modification information composition unit to the transmission destination indicated by the transmission destination information acquired by the transmission destination acquisition unit if there is found a difference between the two recipes based on the difference/sameness information acquired by the difference/sameness information acquisition unit.

With this configuration, if the content of the recipe is modified, it is possible to call attention to the modification, thereby preventing an occurrence of a lot-out or the like caused by a careless modification of the content of the recipe. Further, if there is found a difference between two compared recipes based on the difference/sameness information, the modification information is transmitted, thereby preventing unnecessary modification information from being transmitted.

Furthermore, a server device in accordance with the present invention relates to a server device included in a group management system, which includes one or more manufacturing apparatuses for performing a predetermined semiconductor process on a target substrate and the server device connected with the one or more manufacturing apparatuses, the server device including: a recipe storage unit for storing therein at least a recipe used in the one or more manufacturing apparatuses; a recipe receiving unit for receiving the recipe of the manufacturing apparatus; a recipe accumulation unit for accumulating the recipe received by the recipe receiving unit in the recipe storage unit; a master recipe storage unit for storing therein a master recipe serving as a reference recipe; a modification information composition unit for composing modification information related to a modification of a content of the recipe; a transmission destination information storage unit for storing therein transmission destination information indicating a transmission destination of the modification information; a transmission destination information acquisition unit for acquiring the transmission destination information from the transmission destination information storage unit; a difference/sameness information acquisition unit for acquiring difference/sameness information indicating whether two recipes are different or not by comparing a newest recipe received by the recipe receiving unit with the master recipe stored in the master recipe storage unit; and a modification information transmitting unit for transmitting the modification information composed by the modification information composition unit to the transmission destination indicated by the transmission destination information acquired by the transmission destination information acquisition unit if there is found a difference between the two recipes based on the difference/sameness information acquired by the difference/sameness information acquisition unit.

With this configuration, if the modification of the content of the recipe results in a difference between the recipe and the master recipe, it is possible to call attention to such a modification, thereby preventing an occurrence of a lot-out or the like caused by a careless modification of the content of the recipe. Further, if there is found a difference between two compared recipes based on the difference/sameness information, the modification information is transmitted, thereby preventing unnecessary modification information from being transmitted.

Furthermore, in the server device in accordance with the present invention, the difference/sameness information acquisition unit may acquire difference/sameness information indicating whether information related to setups of the manufacturing apparatus is different or not by comparing the information related to the setups of the manufacturing apparatus in the two recipes.

Further, in the server device in accordance with the present invention, the information related to the setup of the manufacturing apparatus may indicate a step included in the recipe, and the difference/sameness information acquisition unit may acquire difference/sameness information indicating whether respective steps are different or not by comparing the respective steps included in the two recipes.

Furthermore, in the server device in accordance with the present invention, the difference/sameness information acquisition unit may acquire difference/sameness information indicating whether information related to management of the two recipes is different or not by comparing the information related to the management of the two recipes.

Further, in the server device in accordance with the present invention, the modification information composition unit may compose the modification information including the difference/sameness information acquired by the difference/sameness information acquisition unit. With this configuration, for example, if the difference/sameness information indicates that two compared recipes are different, it is possible to recognize such a non-identity based on the modification information. Further, if the difference/sameness information shows a difference between two compared recipes, it is possible to recognize the difference based on the modification information.

Furthermore, in the server device in accordance with the present invention, the modification information composition unit may compose the modification information including the newest recipe received by the recipe receiving unit. With this configuration, it is possible to recognize a content of the modified recipe based on the modification information. As a result, it is not necessary to access the modified recipe, so that user convenience is enhanced.

Further, the server device in accordance with the present invention may further include a determination unit for determining whether or not the modification information needs to be transmitted, and the modification information transmitting unit may transmit the modification information based on a determination result made by the determination unit.

With this configuration, it is possible to transmit the modification information based on a determination result of the determination unit, thereby preventing unnecessary modification information from being transmitted. Accordingly, it is possible to prevent necessary modification information from being obscured by the unnecessary modification information.

Furthermore, in the server device in accordance with the present invention, the determination unit may determine that the modification information needs to be transmitted if the newest recipe received by the recipe receiving unit satisfies a predetermined condition. With this configuration, by setting an appropriate condition, it is possible to prevent unnecessary modification information from being transmitted.

Further, in the server device in accordance with the present invention, the predetermined condition may imply a case in which it is set that the modification information is to be transmitted with respect to the newest recipe received by the recipe receiving unit.

With this configuration, it is possible to set a recipe having a necessity to transmit the modification information and a recipe not having a necessity to transmit the modification information. Therefore, as for a recipe having a great influence by a modification of the content, it is set to transmit the modification information, thereby appropriately calling attention to the modification.

Furthermore, in the server device in accordance with the present invention, the predetermined condition may imply a case in which modification has not been made for a predetermined period or more with respect to the newest recipe received by the recipe receiving unit.

With this configuration, if a recipe which has been used stably for a specific period or more is modified, it is possible to call attention to the modification of its content by transmitting the modification information. Meanwhile, if a user wishes to find an optimum recipe by trial and error, the modification information is not transmitted in spite of frequent modifications of the recipe, thereby preventing modification information of low necessity from being transmitted. As a result, it is possible to prevent modification information of high necessity from being obscured by modification information of low necessity.

Further, in the server device in accordance with the present invention, the transmission destination information may be set for each recipe, and the transmission destination information acquisition unit may acquire the transmission destination information corresponding to a newest recipe received by the recipe receiving unit.

With this configuration, it is possible to set a transmission destination of the modification information for each recipe. For example, if respective recipes are managed by different managers, it is possible to set the transmission destination corresponding to the manager for each recipe.

Furthermore, in the server device in accordance with the present invention, the transmission destination information may be set for each manufacturing apparatus, and the transmission destination information acquisition unit may acquire the transmission destination information corresponding to the manufacturing apparatus in which a newest recipe received by the recipe receiving unit is used.

With this configuration, it is possible to set a transmission destination of the modification information for each manufacturing apparatus. For example, if respective manufacturing apparatuses are managed by different managers, it is possible to set the transmission destination corresponding to the manager for each manufacturing apparatus.

Effect of the Invention

In accordance with a server device of the present invention, if a content of a recipe is modified, it is possible to recognize the modification, thereby preventing an occurrence of a lot-out or the like caused by a careless modification of the content of the recipe.

BRIEF DESCRIPTION OF THE DRAWINGS

FIG. 10 is a view for showing an example of a recipe in accordance with the embodiment of the present invention;

FIG. 12 is a view for showing an example of recipe management information in accordance with the embodiment of the present invention;

FIG. 13 is a view for showing an example of a condition used for determination by a determination unit in accordance with the embodiment of the present invention;

FIG. 14 is a view for showing an example of text information included in modification information in accordance with the embodiment of the present invention;

FIG. 15 is a view for showing an example of transmission destination information stored in a transmission destination information storage unit in accordance with the embodiment of the present invention;

FIG. 16 is a view for showing an example of modification information transmitted via e-mail in accordance with the embodiment of the present invention;

FIG. 20 is a view for showing an example of transmission destination information stored in the transmission destination information storage unit in accordance with the embodiment of the present invention;

FIG. 21 is a view for showing an example of modification information transmitted via e-mail in accordance with the embodiment of the present invention;

BEST MODE FOR CARRYING OUT THE INVENTION

Figure 1:
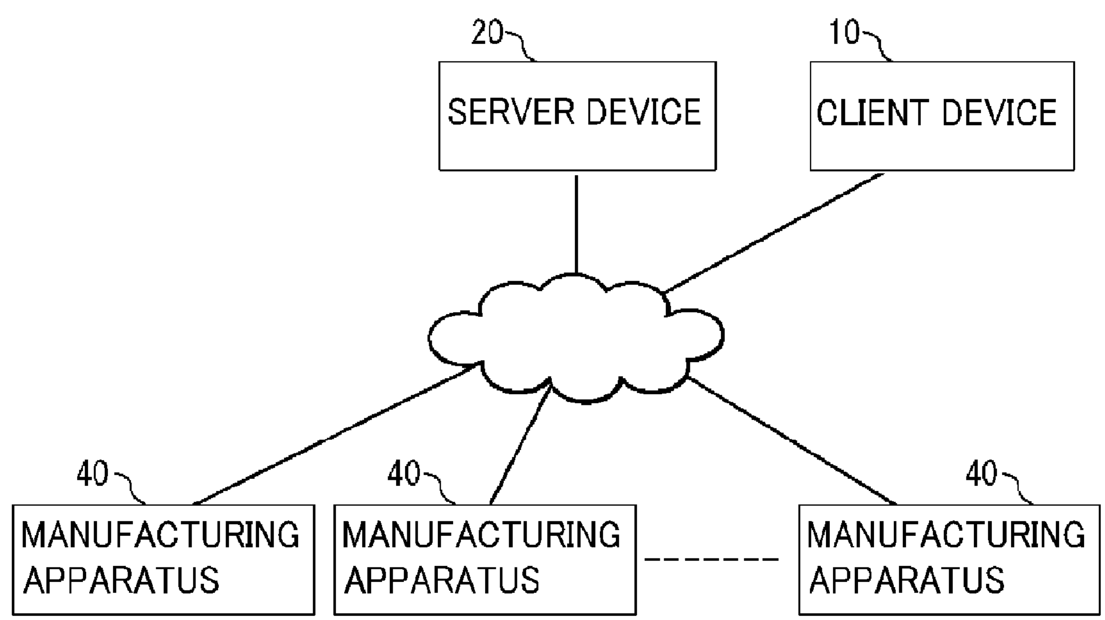
FIG. 1 is a block diagram illustrating a configuration of a group management system in accordance with a first embodiment of the present invention.

Hereinafter, a group management system in accordance with the present invention will be explained in descriptions of embodiments. In the embodiments, components and steps assigned with like reference numerals are operated in the same way, so that redundant description thereof may be omitted.

First Embodiment

There will be explained a group management system in accordance with a first embodiment of the present invention with reference to accompanying drawings. FIG. 1 is a block diagram showing a configuration of a group management system in accordance with the first embodiment of the present invention. Referring to FIG. 1, the group management system includes a client device 10, a server device 20 and N manufacturing apparatuses 40. Here, N refers to an integer of 1 or more. In the group management system, the client device 10, the server device 20 and the one or more manufacturing apparatuses 40 are communicatively connected to each other via a wired or wireless communication line. The communication line can be, e.g., Internet, intranet, public telephone networks or the like.

The client device 10 is a terminal device capable of communicating with the server device 20 and the manufacturing apparatus 40. A user of the client device 10 can modify a content of a recipe retained in, e.g., the manufacturing apparatus 40. Further, the recipe strictly means information indicative of a recipe, but in the present embodiment, it is simply called “recipe.” Furthermore, in the present embodiment, it has been explained that the group management system includes only one client device 10, but the group management system may include two or more client devices 10.

The server device 20, if the recipe retained in the manufacturing apparatus 40 is modified, receives the modified recipe and transmits modification information in response to receipt of the recipe. The details of this process will be explained later. Further, the server device can store therein various kinds of measurement information by one or more manufacturing apparatuses 40. In addition, the server device 20 performs a process according to a request of the client device 10 and may appropriately transmit a result of the process to the client device 10.

The manufacturing apparatus 40 is an apparatus for performing a predetermined semiconductor process on a target substrate. The manufacturing apparatuses 40 is, e.g., a semiconductor manufacturing apparatus, a liquid crystal panel manufacturing apparatus, a plasma display panel manufacturing apparatus or the like. The target substrate is, e.g., a semiconductor wafer, a Flat Panel Display (FPD) substrate or the like. The FPD substrate is, e.g., a glass substrate or the like. It should be noted that as long as the predetermined semiconductor process performed by the manufacturing apparatus 40 on the target substrate includes at least a process related to a semiconductor, its pre-treatment or post-treatment may or may not be included. The process performed by the manufacturing apparatus 40 on the target substrate is, e.g., a film-forming process, an etching process, a thermal oxidation process or the like.

Figure 2:
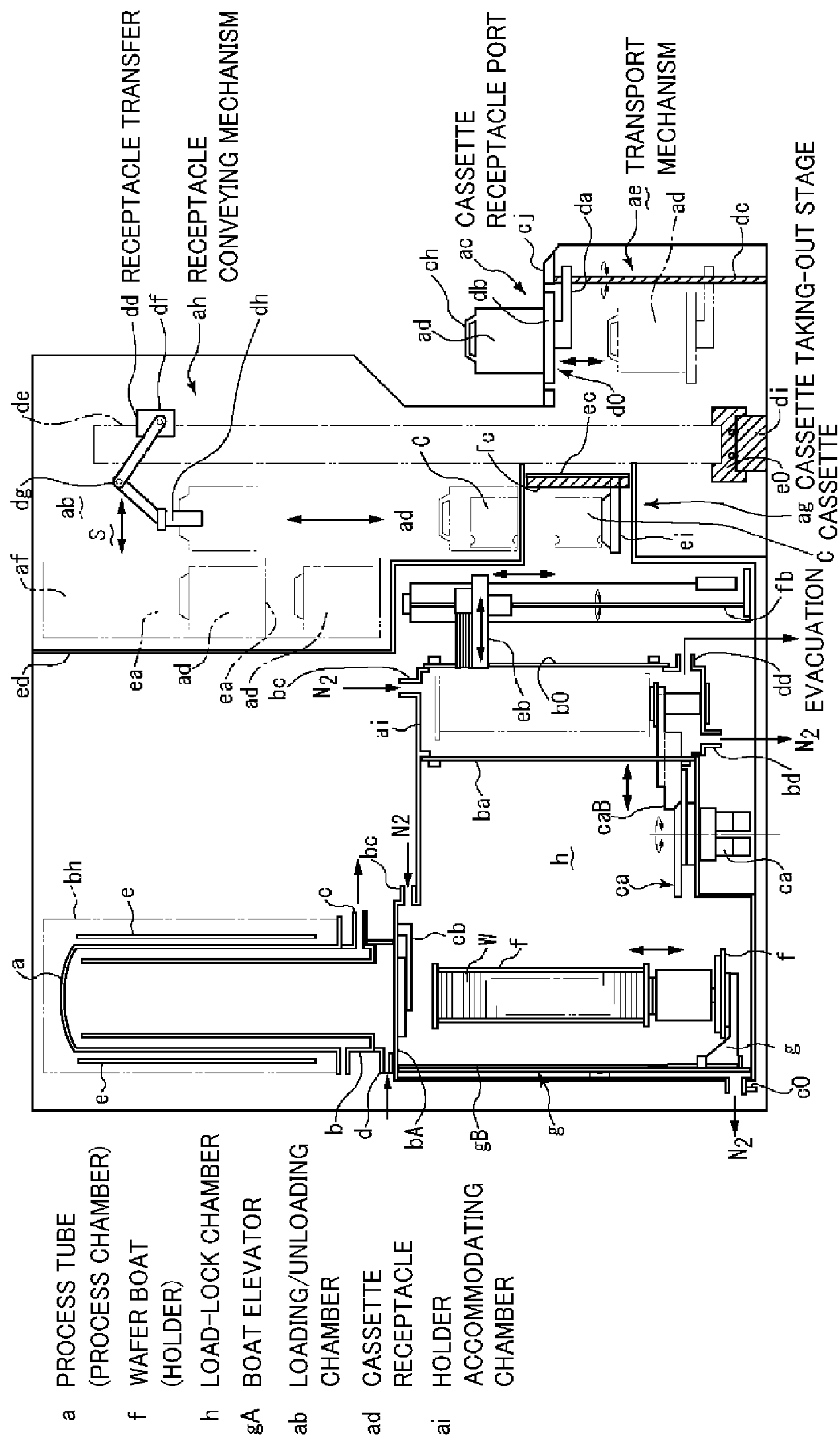
FIG. 2 is a view for showing an example of a manufacturing apparatus in accordance with the embodiment of the present invention.

The manufacturing apparatus 40 is, for example, a batch type vertical heat treatment apparatus disclosed in the above-stated Patent Document 2 or Patent Document 3. An example of the manufacturing apparatus 40 is illustrated in FIG. 2. The manufacturing apparatus 40 is an apparatus having, as a loading chamber, a so-called load lock chamber structure capable of being airtightly sealed against other chambers while allowing a supply or an exhaust of an $N_2$ gas as a nonreactive atmosphere. The manufacturing apparatus 40 includes, as major components, a process tube a serving as a processing chamber for performing a preset process on a wafer W which is a target object to be processed; a load lock chamber h serving as a loading chamber having a transfer mechanism g for loading or unloading a wafer boat f into or from the process tube a, wherein the wafer boat f serves as a holder for accommodating therein a number of, for example, 100 sheets of wafer W; a loading/unloading chamber ab for loading or unloading the wafer W into or from the load lock chamber h; a cassette receptacle port ac formed at the loading/unloading chamber ab; a transport mechanism ae for transporting a cassette receptacle ad mounted on the port ac into the loading/unloading chamber ab; a receptacle storage stage of for temporarily storing therein the transported cassette receptacle ad; a cassette take-out stage ag for taking out a cassette C accommodated in the cassette receptacle ad; a receptacle conveying mechanism ah for performing a conveyance of the cassette receptacle ad within the loading/unloading chamber ab; and a holder accommodating chamber ai disposed between the load lock chamber h and the loading/unloading chamber ab, for accommodating the wafer boat f therein. Further, since other components of the example manufacturing apparatus 40 in FIG. 2 and their operations are already known (see Patent Document 2), their detailed description will be omitted. Furthermore, a chamber as shown in FIG. 1 of Patent Document 3 is desirable as a chamber of the manufacturing apparatus 40. Furthermore, the manufacturing apparatus 40 can be anything other than one shown in FIG. 2. In addition, for example, a recipe that is information related to a predetermined semiconductor process on a target substrate is stored in the manufacturing apparatus 40, and may be used for a process control.

Hereinafter, the configurations of the client device 10, the server device 20 and the manufacturing apparatus 40 in accordance with the present embodiment will be explained with reference to the block diagrams shown in FIGS. 3 to 5. In the block diagrams in FIGS. 3 to 5, only featured parts in the group management system in accordance with the present embodiment are illustrated and other parts are omitted, but the client device 10, the server device 20, the manufacturing apparatus 40 may have configurations for performing a process related to manufacture of a device having a semiconductor, such as a configuration for transferring a target substrate in the manufacturing apparatus 40, or a configuration for transmitting information on the temperature, pressure, or the like during a manufacturing process in the manufacturing apparatus 40 to the server device 20.

Figure 3:
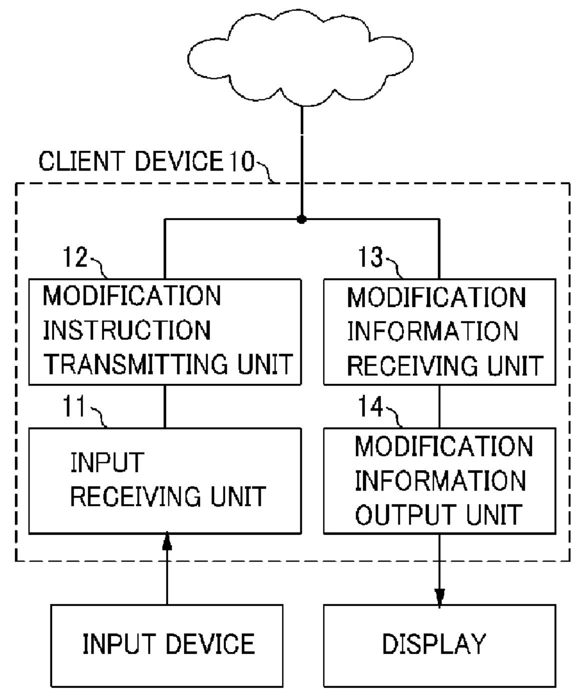
FIG. 3 is a bock diagram showing a configuration of a client device in accordance with the embodiment of the present invention.

FIG. 3 is a block diagram showing a configuration of the client device 10 in accordance with the present embodiment. In FIG. 3, the client device 10 in accordance with the present embodiment includes an input receiving unit 11, a modification instruction transmitting unit 12, a modification information receiving unit 13, and a modification information output unit 14.

The input receiving unit 11 receives input information from an input device (e.g., a keyboard, a mouse, a touch panel or the like). The input receiving unit 11 receives a content of a modification instruction transmitted by the following modification instruction transmitting unit 12, an order for transmitting the modification instruction, and information specifying a transmission destination of the modification instruction, and the like. Further, the input receiving unit 11 can be embodied by hardware or software such as a driver for driving a specific device, or the like.

The modification instruction transmitting unit 12 transmits the modification instruction to the manufacturing apparatus 40. The modification instruction is an instruction for modifying the content of the recipe retained in the manufacturing apparatus 40. Modifying the content of the recipe means modifying a parameter or the like set in the recipe. The modification instruction transmitting unit may transmit the modification instruction to the manufacturing apparatus 40 directly or via a predetermined server. Further, the modification instruction transmitting unit 12 may or may not include a communication device (e.g., a modem, a network card or the like) for performing communication (if not, there is provided a non-illustrated communication device between the modification instruction transmitting unit 12 and a communication line). Furthermore, the modification instruction transmitting unit 12 can be embodied by hardware or software such as a driver for driving the communication device, or the like.

The modification information receiving unit 13 receives modification information transmitted from the server device 20. The details of the modification information will be explained later. Further, the modification information receiving unit 13 may or may not include a receiving device (e.g., a modem, a network card or the like) for performing a reception (if not, there is provided a non-illustrated receiving device between the modification information receiving unit 13 and a communication line). Furthermore, the modification information receiving unit 13 can be embodied by hardware or software such as a driver for driving the receiving device, or the like.

The modification information output unit 14 outputs modification information received by the modification information receiving unit 13. Here, the output can be, e.g., displayed on a display device (e.g., CRT, a liquid crystal display device or the like); transmitted to a predetermined apparatus via the communication line; printed out by a printer; outputted in voice by a speaker; or outputted by operating a red flashlight. In the present embodiment, the output is displayed on the display unit. Further, the modification information output unit 14 may or may not include a device (e.g., a display device, a printer or the like) for performing output. Furthermore, the modification information output unit 14 can be embodied by hardware or software such as a driver for driving such devices, or the like.

Figure 4:
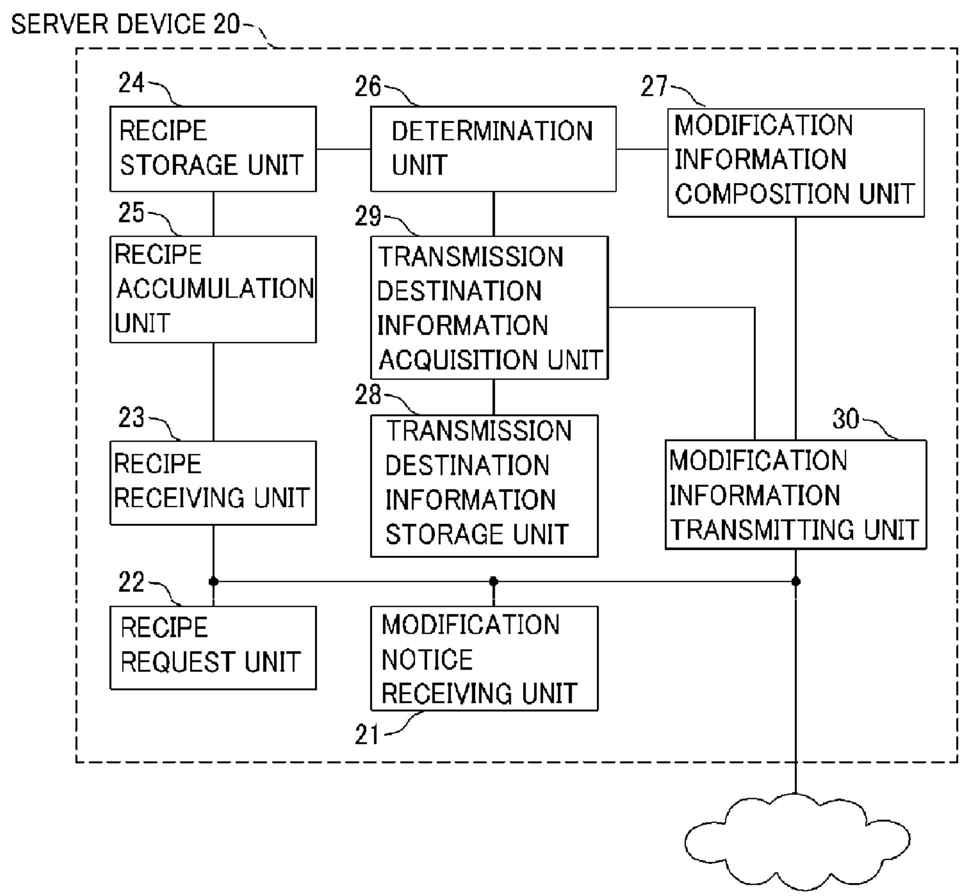
FIG. 4 is a block diagram showing a configuration of a server device in accordance with the embodiment of the present invention.

FIG. 4 is a block diagram showing a configuration of the server device 20 in accordance with the present embodiment. In FIG. 4, the server device 20 in accordance with the present embodiment includes a modification notice receiving unit 21, a recipe request unit 22, a recipe receiving unit 23, a recipe storage unit 24, a recipe accumulation unit 25, a determination unit 26, a modification information composition unit 27, a transmission destination information storage unit 28, a transmission destination information acquisition unit 29, and a modification information transmitting unit 30.

The modification notice receiving unit 21 receives a modification notice. Here, the modification notice is information notifying a purport of a modification of the content of the recipe retained in the manufacturing apparatus 40. The modification notice is transmitted from the manufacturing apparatus 40 having the recipe whose content is modified. It is desirable to indicate, by the modification notice, which manufacturing apparatus 40 retains a recipe having a modified content, or which recipe has a modified content. For example, it may be possible to specify a manufacturing apparatus 40 having a recipe whose content is modified by a transmission source address of the modification notice or the like, or apparatus identification information for identifying a manufacturing apparatus 40 having a recipe whose content is modified may be included in the modification notice. Furthermore, recipe identification information for identifying a recipe whose content is modified may be included in the modification notice.

Further, the modification notice receiving unit 21 may or may not include a receiving device (e.g., a modem, a network card or the like) for performing a reception (if not, there is provided a non-illustrated receiving device between the modification notice receiving unit 21 and a communication line). Furthermore, the modification notice receiving unit 21 can be embodied by hardware or software such as a driver for driving the receiving device, or the like.

If the modification notice receiving unit 21 receives a modification notice, the recipe request unit 22 transmits a request for transmitting a modified recipe, to a manufacturing apparatus 40 having a modified content of a recipe notified by the received modification notice. Here, modifying the content of the recipe may mean, e.g., modifying a content of information related to a setup of the manufacturing apparatus 40 in the recipe, or modifying a content of information related to a recipe management. The information related to the setup of the manufacturing apparatus 40 in the recipe may be, e.g., information related to a process of the manufacturing apparatus 40, information on a layout of the manufacturing apparatus 40, or other information related to the setup of the manufacturing apparatus 40. The information on the recipe management may be, e.g., information on whether or not a content of the recipe is modified, or the like. The recipe may include both the information on the setup of the manufacturing apparatus 40 in the recipe and the information on the recipe management. Otherwise, the recipe may include the information on the setup of the manufacturing apparatus 40 in the recipe but may not include the information on the recipe management. The information on the setup of the manufacturing apparatus 40 in the recipe and the information on the recipe management may be written in one file or in separate files. The recipe request unit 22 transmits a request for transmitting a recipe, to, e.g., a transmission source address of the modification notice received by the modification notice receiving unit 21.

Besides, the recipe request unit 22 may or may not include a transmitting device (e.g., a modem, a network card or the like) for performing transmission (if not, there is provided a non-illustrated transmitting device between the recipe request unit 22 and a communication line). Furthermore, the recipe request unit 22 can be embodied by hardware or software such as a driver for driving the transmitting device, or the like.

The recipe receiving unit 23 receives a modified recipe from the manufacturing apparatus 40, wherein the modified recipe is transmitted in response to a request transmitted from the recipe request unit 22. That is, if a content of the recipe retained in the manufacturing apparatus 40 is modified, the recipe receiving unit 23 receives the modified recipe. Further, the recipe receiving unit 23 may receive information other than the recipe. For example, the recipe receiving unit 23 may receive apparatus identification information for identifying the manufacturing apparatus 40 in which the content of the recipe is modified together with the recipe, or a user name or a user ID who modifies the content of the recipe together with the recipe. Furthermore, the recipe receiving unit 23 may or may not include a receiving device (e.g., a modem, a network card or the like) for performing a reception (if not, there is provided a non-illustrated receiving device between the recipe receiving unit 23 and a communication line). Furthermore, the recipe receiving unit 23 can be embodied by hardware or software such as a driver for driving the receiving device, or the like.

The recipe storage unit 24 stores at least a recipe used in one or more manufacturing apparatuses 40. The recipe storage unit 24 may or may not store a recipe which was used in the manufacturing apparatus 40 in the past. In the present embodiment, there will be explained the former case. The recipe storage unit 24 may store, e.g., a recipe and apparatus identification information for identifying a manufacturing apparatus 40 so as to recognize which manufacturing apparatus 40 corresponds to the stored recipe. The recipe storage unit 24 can be embodied by a specific storage medium (e.g., a semiconductor memory, a magnetic disc, an optical disc or the like). A memory stored in the recipe storage unit 24 may be a temporary memory of the recipe written in a RAM or the like or a long-term memory of the recipe.

The recipe accumulation unit 25 accumulates a recipe received by the recipe receiving unit 23 in the recipe storage unit 24.

The determination unit 26 determines whether or not the modification information needs to be transmitted. If a newest recipe received by the recipe receiving unit 23 satisfies a predetermined condition, the determination unit 26 may determine that the modification information needs to be transmitted. The predetermined condition may imply a case in which it is set the modification information is to be transmitted with respect to the newest recipe received by the recipe receiving unit 23, or may imply a case in which modification has not been made for a predetermined period or more with respect to the newest recipe received by the recipe receiving unit 23.

The modification information composition unit 27 composes modification information related to a modification of a content of a recipe. The modification information composition unit 27 may compose, e.g., modification information containing a purport of modifying the content of the recipe, modification information including the newest recipe, i.e., a modified recipe, received by the recipe receiving unit 23, or modification information including a difference between the non-modified recipe stored in the recipe storage unit 24 and a modified recipe received by the recipe receiving unit 23. It is desirable that the modification information includes identification information for identifying a recipe whose content is modified. It is more desirable that the modification information includes identification information for identifying a manufacturing apparatus 40 retaining therein a recipe whose content is modified. Further, the modification information may include information for specifying a user who modifies a content of a recipe such as a user name, a user ID or the like. Furthermore, the modification information may include information indicative of a date and time when a content of a recipe is modified.

The transmission destination information storage unit stores therein transmission destination information indicative of a transmission destination of the modification information. The transmission destination information may be set for each recipe, or for each manufacturing apparatus 40 in which the recipe is used. Further, the transmission destination information may be set for a combination of both cases, or may be set the same in all recipes and manufacturing apparatuses 40. Besides, the transmission destination indicated by the transmission destination information may be singular or plural. Further, the transmission destination indicated by the transmission destination information may include an address of the transmission destination in the transmission destination information such as an IP address, a mail address, a telephone number or the like, or information for specifying an apparatus of the transmission destination such as apparatus identification information. In the latter case, for example, by using information for matching the apparatus identification information or the like with an address, it is possible to obtain the address corresponding to the apparatus identification information or the like. A memory stored in the transmission destination information storage unit 28 may be a temporary memory of the transmission destination information written in a RAM or the like, or a long-term memory of the transmission destination information. In the former case, the transmission destination information storage unit 28 may be, for example, a memory in which the transmission source's address of a packet received by the server device 20 is temporarily stored, or the like.

Further, there is no limitation on a process of storing the transmission destination information in the transmission destination information storage unit 28. For example, it may be possible to store the transmission destination information in the transmission destination information storage unit 28 by using, e.g., a storage medium; to store the transmission destination information received via a communication line in the transmission destination information storage unit 28; or to store the transmission destination information inputted through an input device in the transmission destination information storage unit 28.

The transmission destination information acquisition unit 29 acquires transmission destination information from the transmission destination information storage unit 28. Further, if the transmission destination information is set for each recipe, for example, the transmission destination information acquisition unit 29 acquires transmission destination information corresponding to the newest recipe received by the recipe receiving unit 23. In addition, if the transmission destination information is set for each manufacturing apparatus 40, for example, the transmission destination information acquisition unit 29 acquires transmission destination information corresponding to the manufacturing apparatus 40 in which the newest recipe received by the recipe receiving unit 23 is used.

The modification information transmitting unit 30 transmits modification information composed by the modification information composition unit 27 to a transmission destination indicated by the transmission destination information acquired by the transmission destination information acquisition unit 29. The modification information transmitting unit 30 transmits the modification information based on a determination result made by the determination unit 26. That is, if the determination unit 26 determines that the modification information is to be transmitted, the modification information may be transmitted, but if the determination unit 26 determines that the modification information is not to be transmitted, the modification information may not be transmitted. Consequently, the transmission of the modification information based on the determination result made by the determination unit 26 will be good if it proceeds as stated above. Accordingly, for example, if the modification information composition unit 27 composes the modification information, the modification information transmitting unit 30 transmits the modification information. Therefore, if the determination unit 26 determines that the modification information is to be transmitted, the modification information composition unit 27 may compose the modification information, but if the determination unit 26 determines that the modification information is not to be transmitted, the modification information composition unit 27 does not need to compose the modification information. Further, for example, if the transmission destination information acquisition unit 29 acquires the transmission destination information, the modification information transmitting unit 30 transmits the modification information. Therefore, if the determination unit 26 determines that the modification information is to be transmitted, the transmission destination information acquisition unit 29 may acquire the transmission destination information, but if the determination unit 26 determines that the modification information is not to be transmitted, the transmission destination information acquisition unit 29 does not need to acquire the transmission destination information.

The transmission of the modification information by the modification information transmitting unit 30 can be performed in a way of, e.g., an e-mail transmission, an FTP communication, a transmission through other IP communications, an automatic fax transmission, an auto-voice calling, or the like. Further, the modification information transmitting unit 30 may transmit the modification information directly to the transmission destination or transmit it via a predetermined server.

Besides, the modification information transmitting unit 30 may or may not include a transmitting device (e.g., a modem, a network card or the like) for performing a transmission (if not, there is provided a non-illustrated transmitting device between the modification information transmitting unit 30 and a communication line). Furthermore, the modification information transmitting unit 30 can be embodied by hardware or software such as a driver for driving the transmitting device, or the like.

The recipe storage unit 24 and the transmission destination information storage unit 28 can be embodied in the same storage medium or in separate storage media. In the former case, an area storing recipes becomes a recipe storage unit 24 and an area storing transmission destination information becomes a transmission destination information storage unit 28.

Figure 5:
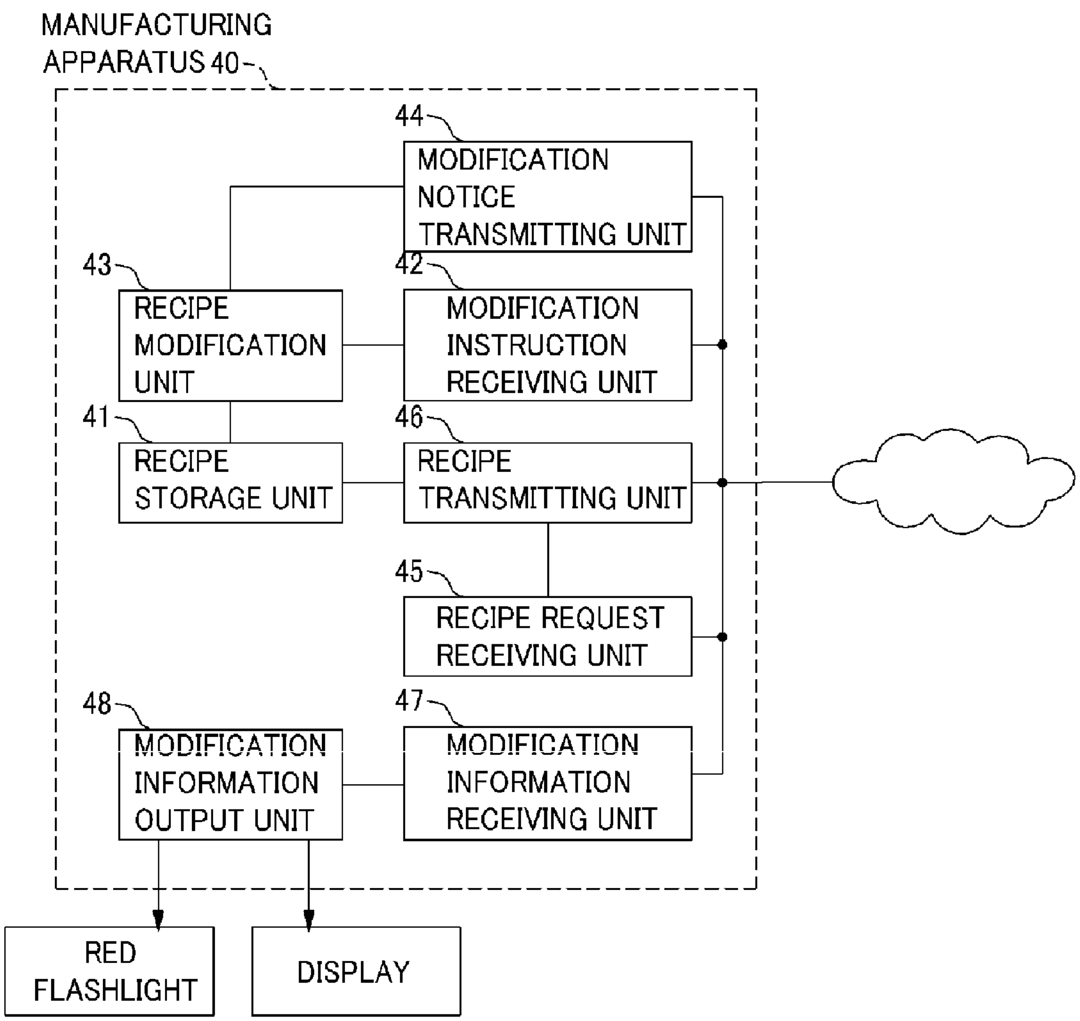
FIG. 5 is a block diagram showing a configuration of a manufacturing apparatus in accordance with the embodiment of the present invention.

FIG. 5 is a block diagram showing a configuration of the manufacturing apparatus 40 in accordance with the present embodiment. In FIG. 5, the manufacturing apparatus in accordance with the present embodiment includes a recipe storage unit 41, a modification instruction receiving unit 42, a recipe modification unit 43, a modification notice transmitting unit 44, a recipe request receiving unit 45, a recipe transmitting unit 46, a modification information receiving unit 47 and a modification information output unit 48.

The recipe storage unit 41 stores therein a recipe used in the manufacturing apparatus 40. The recipe storage unit 41 may or may not store a recipe which was used in the manufacturing apparatus 40 in the past. The recipe storage unit 41 can be embodied by a specific storage medium (e.g., a semiconductor memory, a magnetic disc, an optical disc or the like). A memory stored in the recipe storage unit 41 may be a temporary memory of the recipe written in a RAM or the like or a long-term memory of the recipe.

The modification instruction receiving unit 42 receives a modification instruction. The modification instruction is an instruction containing a purport of modifying a content of a recipe stored in the recipe storage unit 41. Here, the reception can be, e.g., a reception of the modification instruction inputted by the input device (e.g., a keyboard, a mouse, a touch panel or the like), a reception of the modification instruction transmitted via a wired or wireless communication line, or a reception of the modification instruction read from a specific storage medium (e.g., an optical disc, a magnetic disc, a semiconductor memory or the like). In case of receiving the transmitted modification instruction, the modification instruction may be transmitted from, e.g., the client device 10 or may be transmitted from other devices. In the present embodiment, it is supposed that the modification instruction is transmitted from the client device 10. Further, the modification instruction receiving unit 42 may or may not include a device (e.g., a modem, a network card or the like) for performing a reception. Furthermore, the modification instruction receiving unit 42 can be embodied by hardware or software such as a driver for driving a predetermined device, or the like.

The recipe modification unit 43 modifies a content of the recipe stored in the recipe storage unit 41 according to the modification instruction received by the modification instruction receiving unit 42.

If the recipe modification unit 43 modifies the content of the recipe stored in the recipe storage unit 41, the modification notice transmitting unit 44 transmits, to the server device 20, the modification notice serving as information for notifying a purport of the modification of the content of the recipe. The modification notice may include, e.g., apparatus identification information for identifying a manufacturing apparatus 40 transmitting the modification notice or recipe identification information for identifying a recipe whose content is modified.

Further, the modification notice transmitting unit 44 may or may not include a transmitting device (e.g., a modem, a network card or the like) for performing a transmission (if not, there is provided a non-illustrated transmitting device between the modification notice transmitting unit 44 and a communication line). Furthermore, the modification notice transmitting unit 44 can be embodied by hardware or software such as a driver for driving the transmitting device, or the like.

The recipe request receiving unit 45 receives a request, which contains a purport of transmitting a modified recipe and is transmitted from the server device 20. Further, the recipe request receiving unit 45 may or may not include a receiving device (e.g., a modem, a network card or the like) for performing a reception (if not, there is provided a non-illustrated receiving device between the recipe request receiving unit 45 and a communication line). Furthermore, the recipe request receiving unit 45 can be embodied by hardware or software such as a driver for driving the receiving device, or the like.

If the recipe request receiving unit 45 receives a request containing a purport of transmitting a recipe, the recipe transmitting unit 46 reads the modified recipe stored in the recipe storage unit 41 and transmits the recipe to the server device 20. Further, the recipe transmitting unit 46 may or may not include a transmitting device (e.g., a modem, a network card or the like) for performing a transmission (if not, there is provided a non-illustrated transmitting device between the recipe transmitting unit 46 and a communication line). Furthermore, the recipe transmitting unit 46 can be embodied by hardware or software such as a driver for driving the transmitting device, or the like.

The modification information receiving unit 47 receives modification information transmitted from the server device 20. The modification information is the same as stated above. Further, the modification information receiving unit 47 may or may not include a receiving device (e.g., a modem, a network card or the like) for performing a reception (if not, there is provided a non-illustrated receiving device between the modification information receiving unit 47 and a communication line). Furthermore, the modification information receiving unit 47 can be embodied by hardware or software such as a driver for driving the receiving device, or the like.

The modification information output unit 48 outputs the modification information received by the modification information receiving unit 47. Here, the output can be, e.g., displayed on a display device (e.g., CRT, a liquid crystal display device or the like), transmitted to a predetermined apparatus via a communication line, printed out by a printer, outputted in voice by a speaker, or outputted by operating a red flashlight. In the present embodiment, the output is displayed on the display device and outputted by operating the red flashlight. Further, the modification information output unit 48 may or may not include a device (e.g., a display device, a printer or the like) for performing output. Furthermore, the modification information output unit 48 can be embodied by hardware or software such as a driver for driving such devices, or the like.

Hereinafter, the operation of the client device 10 in accordance with the present embodiment will be explained with reference to a flow chart of FIG. 6.

(Step S101) The input receiving unit 11 determines whether or not an input of modification instruction is received. If the input is received, a process proceeds to step S102; otherwise, the process proceeds to step S103.

(Step S102) The modification instruction transmitting unit 12 transmits the modification instruction to the manufacturing apparatus 40, and then the process returns to step S101.

(Step S103) The modification information receiving unit 13 determines whether or not the modification information is received. If the modification information is received, the process proceeds to step S104; otherwise, the process returns to step S101.

(Step S104) The modification information output unit outputs the modification information received by the modification information receiving unit 13, and then the process returns to step S101.

Figure 6:
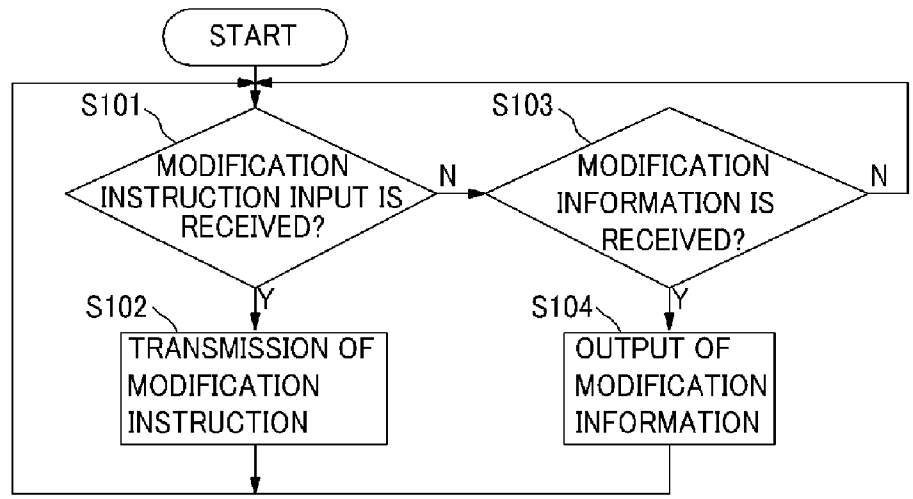
FIG. 6 is a flow chart showing an operation of the client device in accordance with the embodiment of the present invention.

Further, in the flow chart of FIG. 6, the process is ended by an interrupt such as power-off or process ending.

Hereinafter, the operation of the server device 20 in accordance with the present embodiment will be explained with reference to a flow chart of FIG. 7.

(Step S201) The modification notice receiving unit 21 determines whether or not the modification notice is received. If the modification notice is received, the process proceeds to step S202; otherwise, the process of step S201 is repeated until the modification notice is received.

(Step S202) The recipe request unit 22 transmits a request, which contains a purport of transmitting the modified recipe, to the manufacturing apparatus 40 which transmitted the modification notice. For example, the recipe request unit 22 transmits such a request to a transmission source of the modification notice, so that it is possible to transmit the request to the manufacturing apparatus 40 which transmitted the modification notice.

(Step S203) The recipe receiving unit 23 determines whether or not the modified recipe transmitted from the manufacturing apparatus 40 is received. If received, the process proceeds to step S204; otherwise, the process of step S203 is repeated until the modified recipe is received. Further, if the modified recipe is not received although a specific time has passed after the request containing the purport of transmitting the modified recipe was transmitted, it is determined to be time-out, and the process may return to step S201.

(Step S204) The recipe accumulation unit 25 accumulates the recipe received by the recipe receiving unit 23 in the recipe storage unit 24.

(Step S205) The determination unit 26 determines whether or not the modification information related to the modified recipe received by the recipe receiving unit 23 in step S203 needs to be transmitted. Further, if it is determined that the modification information is to be transmitted, the process proceeds to step S206; otherwise, the process returns to step S201.

(Step S206) The modification information composition unit 27 composes modification information upon the modified recipe received by the recipe receiving unit 23 in step S203.

(Step S207) The transmission destination information acquisition unit 29 acquires transmission destination information from the transmission destination information storage unit 28.

(Step S208) The modification information transmitting unit 30 transmits the modification information composed by the modification information composition unit 27 to the transmission destination indicated by the transmission destination information acquired by the transmission destination information acquisition unit 29, and then the process returns to step S201. Further, if the transmission destination information acquisition unit 29 acquires two or more transmission destination information, the modification information transmitting unit 30 may transmit the modification information to each transmission destination indicated by each of the transmission destination information.

Figure 7:
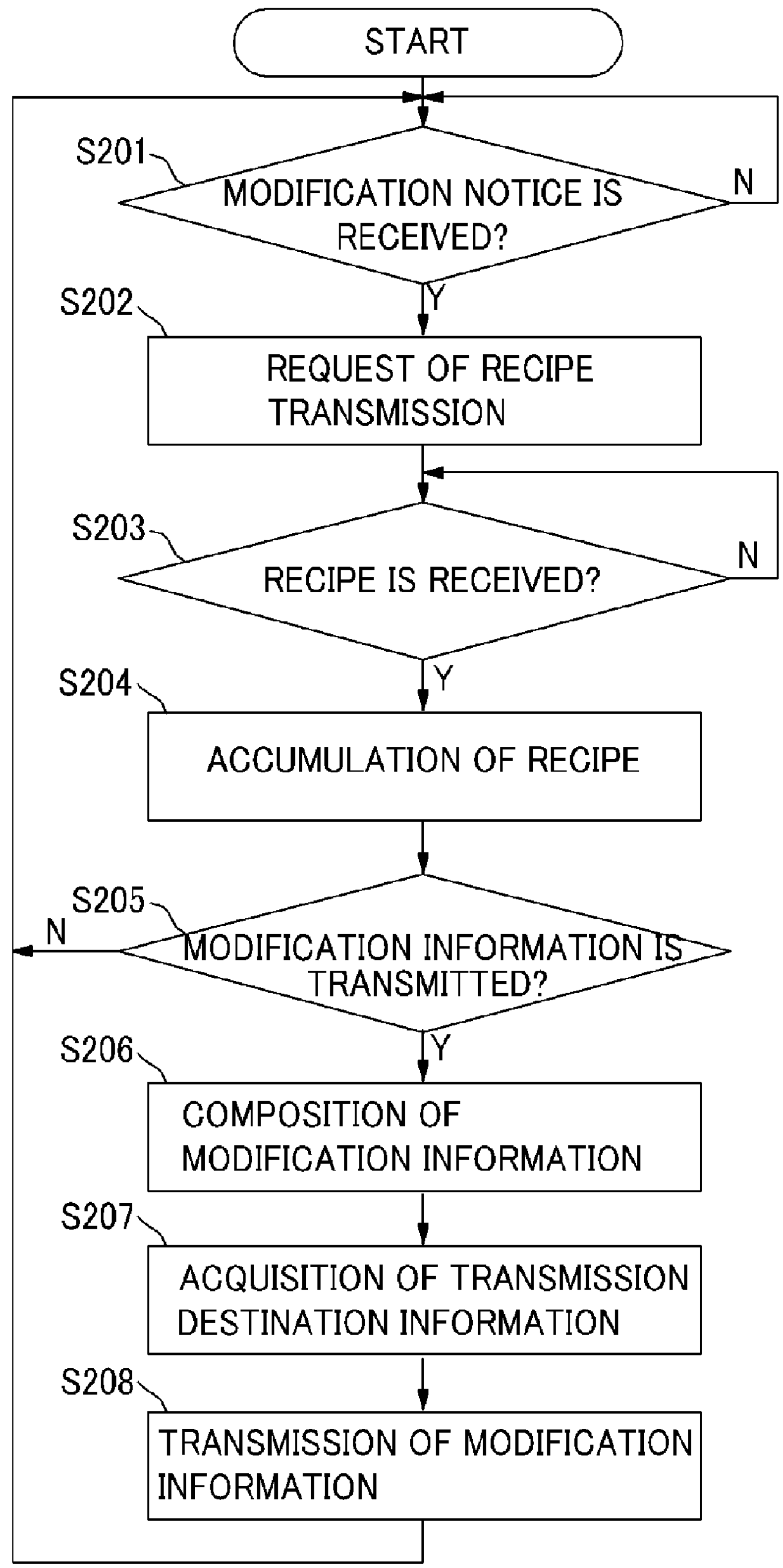
FIG. 7 is a flow chart showing an operation of the server device in accordance with the embodiment of the present invention.

Further, in the flow chart of FIG. 7, the process is ended by an interrupt such as power-off or process ending.

Hereinafter, the operation of the manufacturing apparatus 40 in accordance with the present embodiment will be explained with reference to a flow chart of FIG. 8.

(Step S301) The modification instruction receiving unit 42 determines whether or not the modification instruction is received. If received, the process proceeds to step S302; otherwise, the process proceeds to step S304.

(Step S302) The recipe modification unit 43 modifies the content of the recipe stored in the recipe storage unit 41 according to the modification instruction received by the modification instruction receiving unit 42.

(Step S303) The modification notice transmitting unit transmits, to the server device 20, the modification notice serving as information for notifying a purport of the modification of the content of the recipe, and then the process returns to step S301.

(Step S304) The recipe request receiving unit 45 determines whether or not a request containing a purport of transmitting the modified recipe is received. If received, the process proceeds to step S305; otherwise, the process proceeds to step S306.

(Step S305) The recipe transmitting unit 46 reads the modified recipe from the recipe storage unit 41 and transmits the read recipe to the server device 20, and then the process returns to step S301.

(Step S306) The modification information receiving unit 47 determines whether or not the modification information is received. If received, the process proceeds to step S307; otherwise, the process returns to step S301.

(Step S307) The modification information output unit 48 outputs the modification information received by the modification information receiving unit 47, and then the process returns to step S301.

Figure 8:
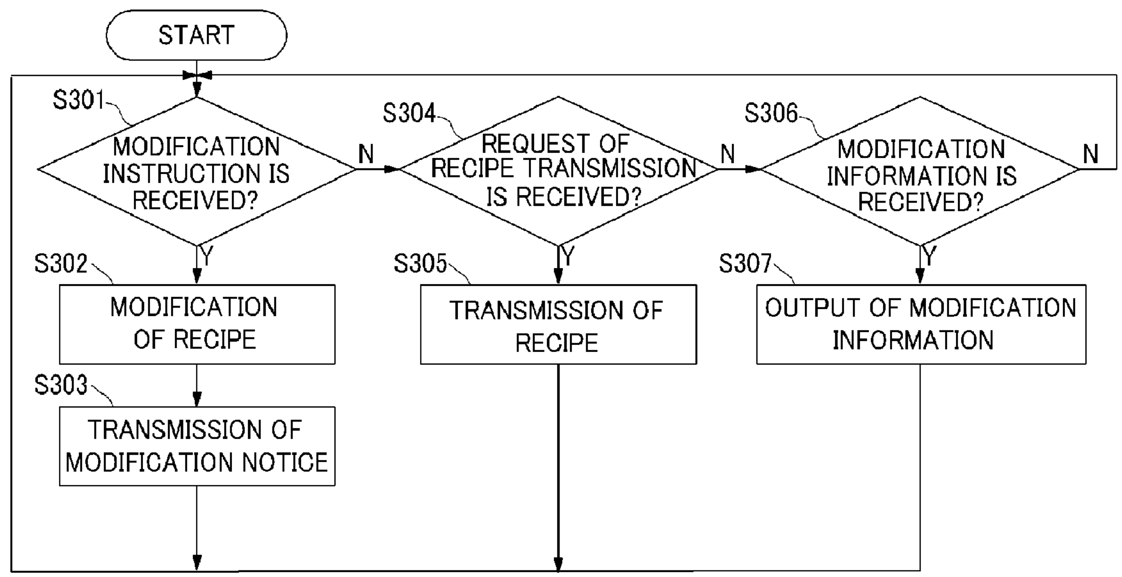
FIG. 8 is a flow chart showing an operation of the manufacturing apparatus in accordance with the embodiment of the present invention.

In addition, in the flow chart of FIG. 8, the process is ended by an interrupt such as power-off or process ending. Further, when the content of the recipe is modified according to the modification instruction, based on an authority of a user who inputs the modification instruction or transmits the modification instruction, it is determined whether or not the content of the recipe can be modified according to the modification instruction. If it is determined that the content of the recipe can be modified, the content of the recipe may be modified.

Hereinafter, the operation of the group management system in accordance with the present embodiment will be explained by a detailed example.

Figure 9:
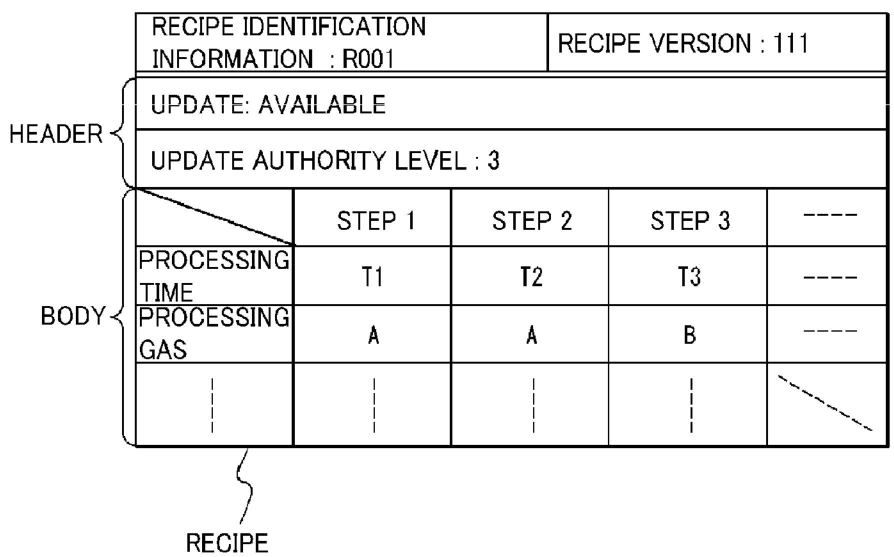
FIG. 9 is a view for showing an example of a recipe in accordance with the embodiment of the present invention.

In the detailed example, each of the manufacturing apparatuses 40 is identified by apparatus identification information. In the recipe storage unit 41 of the manufacturing apparatus 40 identified by apparatus identification information 「D001」 stores therein a recipe illustrated in FIG. 9 as a newest recipe. The recipe illustrated in FIG. 9 is identified by recipe identification recipe 「R001」, and a version of the recipe is indicated as 「111」. The more recent the version of the recipe is, the greater a value becomes. Further, there may be an instance where the recipe identified by the recipe identification information 「R001」 is called as a recipe R001. It may be also applied to other recipes.

Further, a recipe illustrated in FIG. 9 has a header and a body. The header includes information on the recipe management. To be specific, the header includes information indicating whether or not the recipe can be updated, and information on a level showing an authority required for updating the recipe. It is indicated in the header that if a user having an update authority level 3 or more inputs or transmits the modification instruction, the recipe modification unit 43 modifies a content of the recipe according to the modification instruction.

The body includes information related to a setup of the manufacturing apparatus 40. This information may include, e.g., a process of the manufacturing apparatus 40, a layout of the manufacturing apparatus 40, or other setups of the manufacturing apparatus 40. In this detailed example, as illustrated in FIG. 9, the body of the recipe includes the information on the process.

First of all, it is supposed that a user having update authority level 3 or more, who is a user of the client device 10, operates an input device connected to the client device 10 in order to input a modification instruction containing a purport of modifying a processing time of step 2 of recipe R001 in the manufacturing apparatus identified by the apparatus identification information 「D001」 to be 「T20」 and modifying a processing gas of step of recipe R001 to be 「C」. Then, the modification instruction is received by the input receiving unit 11 (step S101) and sent to the modification instruction transmitting unit 12. The modification instruction transmitting unit 12 transmits the modification instruction received from the input receiving unit 11 and the update authority level of the user performing the operation at the client device 10 to the manufacturing apparatus 40 identified by the apparatus identification information 「D001」 (step S102).

The modification instruction is transmitted via a communication line and received by the modification instruction receiving unit 42 of the manufacturing apparatus identified by the apparatus identification information 「D001」 (step S301). Subsequently, with reference to the recipe storage unit 41, the recipe modification unit 43 acquires information that the recipe R001 to be modified according to the modification instruction is updatable and its update authority level is 3. Since the modification instruction receiving unit 42 receives an update authority level which is 3 or more, the recipe modification unit 43 determines that the recipe R001 is updatable based on the modification instruction; updates the recipe R001 according to the modification instruction; and increments a version of the recipe by 1 (step S302). Accordingly, the recipe stored in the recipe storage unit 41 becomes one as illustrated in FIG. 10.

Then, the modification notice transmitting unit 44 composes a modification notice including: the recipe identification information 「R001」 on the recipe whose content is modified by the recipe modification unit 43; the apparatus identification information 「D001」 of the manufacturing apparatus 40; and a purport of modifying the recipe, and transmits the modification notice to the server device 20 (step S303). It is supposed that the modification notice transmitting unit 44 already knows an address of the server device 20 at the time of transmitting the modification notice.

The modification notice is transmitted via a communication line and received by the modification notice receiving unit 21 of the server device 20 (step S201), and then the recipe request unit 22 transmits a request for transmitting a modified recipe to the manufacturing apparatus 40 (step S202). The transmission destination of the request is a transmission source's address of the modification notice received by the modification notice receiving unit 21.

The request is transmitted via a communication line and received by the recipe request receiving unit 45 of the manufacturing apparatus 40 identified by the apparatus identification information 「D001」 (step S304). Then, the recipe transmitting unit 46 reads the modified recipe stored in the recipe storage unit 41, i.e., the recipe illustrated in FIG. 10 and then transmits it to the server device 20 (step S305). In addition to this recipe, the apparatus identification information 「D001」 on the manufacturing apparatus 40 is also transmitted.

Figure 11:
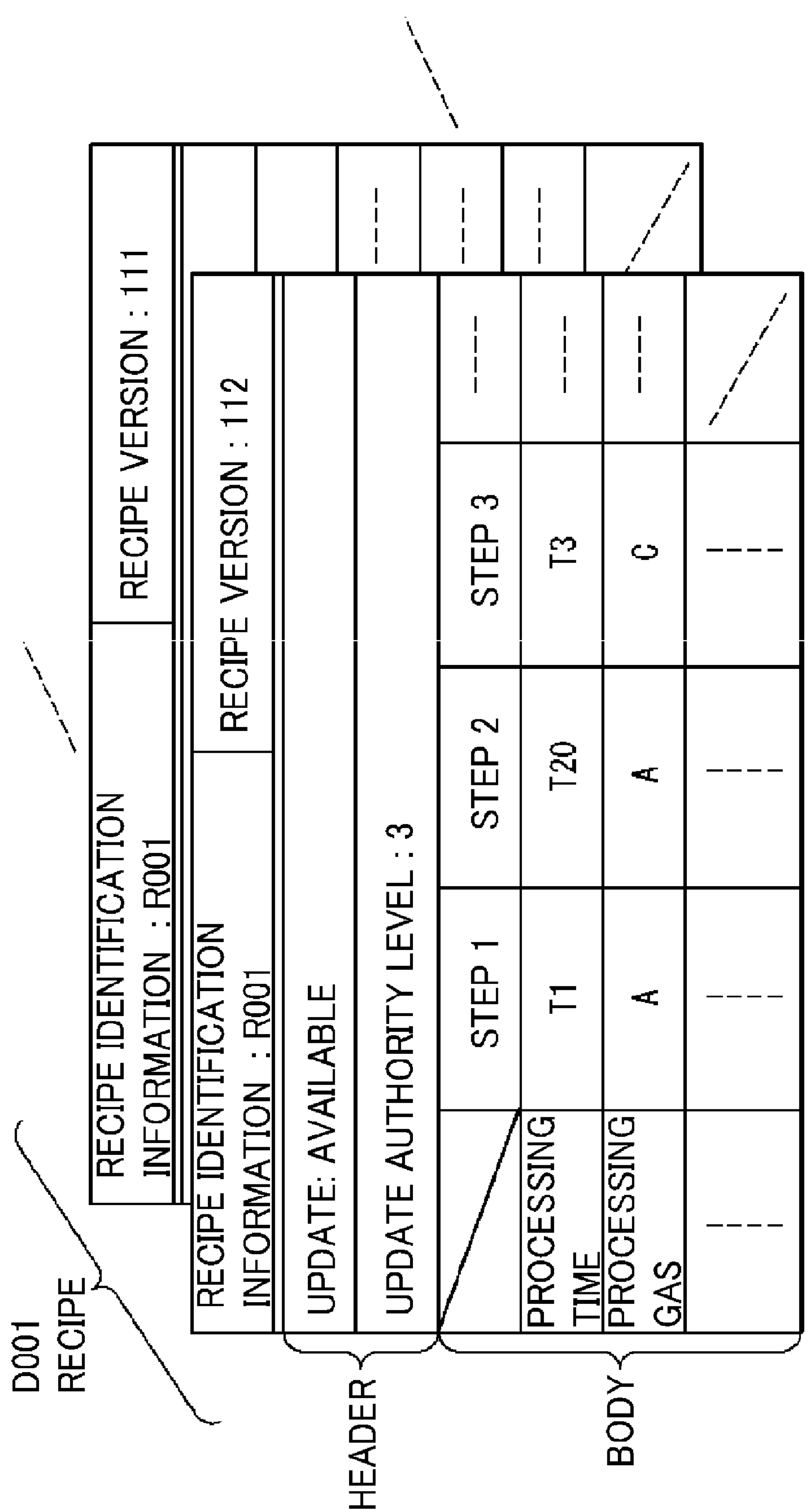
FIG. 11 is a view for showing an example of recipes in accordance with the embodiment of the present invention.

The recipe and the like are transmitted via the communication line and received by the recipe receiving unit 23 of the server device 20 (step S203). Then, the recipe accumulation unit 25 matches the recipe with the apparatus identification information 「D001」 and accumulates the recipe in the recipe storage unit 41 (step S204). FIG. 11 shows recipes of the manufacturing apparatus 40 identified by the apparatus identification information 「D001」, accumulated in such a way.

Further, the recipe storage unit 24 stores recipe management information as well as the recipe. The recipe management information is relation information on a manufacturing apparatus 40, a recipe, a version of the recipe and a date and time when the recipe is modified. FIG. 12 illustrates an example of the recipe management information stored in the recipe storage unit 24. As shown in a first record of FIG. 12, the recipe accumulation unit accumulates the apparatus identification information 「D001」 received by the recipe receiving unit 23, the recipe identification information 「R001」 received by the recipe receiving unit 23, a version 「112」 of the recipe, a date and time 「Sep. 15, 2006 11:00 AM」 when a content of the recipe is modified. Furthermore, the date and time may be a date and time when the recipe receiving unit 23 receives a modified recipe, and if a date and time when the recipe in the manufacturing apparatus 40 is modified is transmitted from the manufacturing apparatus 40, such a date and time may be one instance, or the other date and time information related to the modification of the content of the recipe may be one instance.

If a specific content of the recipe is modified, the determination unit 26 determines that the modification information is to be transmitted. FIG. 13 shows recipe identification information stored in a non-illustrated storage medium, and the recipe identification information indicates that its modification information is to be transmitted by a determination of the determination unit 26. In this detailed example, since the recipe R001 is modified, the determination unit 26 determines the modification information to be transmitted with reference to the information shown in FIG. 13 (step S205). Then, the determination unit 26 sends the recipe identification information ⌈R001⌋ to the transmission destination information acquisition unit 29; reads the newest version of the recipe R001 from the recipe storage unit 24; and sends, to the modification information composition unit 27, the recipe R001, the apparatus identification information ⌈D001⌋ on the manufacturing apparatus 40 in which the content of the recipe is modified, and the recipe identification information ⌈R001⌋ of the recipe.

The modification information composition unit 27 composes text information illustrated in FIG. 14 by using the apparatus identification information or the like. The text information may be composed by the modification information composition unit 27 by using a template stored in a non-illustrated storage medium. Further, the modification information composition unit 27 composes the modification information including the text information and the recipe R001 (step S206) and sends the composed modification information to the modification information transmitting unit 30.

The transmission destination information storage unit 28, as illustrated in FIG. 15, stores therein the recipe identification information and the corresponding transmission destination information. The transmission destination information acquisition unit 29 acquires the transmission destination information such as ⌈user001@tel . . . com⌋, ⌈C001⌋ and ⌈manufacturing apparatus having the recipe⌋ which corresponds to the recipe identification information ⌈R001⌋ received from the determination unit 26 (step S207). Further, since the transmission destination information ⌈manufacturing apparatus having the recipe⌋ is acquired, the transmission destination information acquisition unit 29 inquires of the determination unit 26 and acquires the apparatus identification information ⌈D001⌋ of the manufacturing apparatus 40, in which the content of the recipe is modified, as the transmission destination information. Furthermore, the transmission destination information acquisition unit 29 sends the transmission destination information such as ⌈user001@tel . . . com⌋, ⌈C001⌋ and ⌈D001⌋ to the modification information transmitting unit 30.

If the modification information transmitting unit 30 receives the transmission destination information such as ⌈user001@tel . . . com⌋, ⌈C001⌋ and ⌈D001⌋, the modification information transmitting unit 30 composes and transmits an e-mail as illustrated in FIG. 16 with respect to the first transmission destination information. In this e-mail, the transmission destination's address is an e-mail address indicated by the transmission destination information. Further, the transmission source's address is set in advance in the modification information transmitting unit 30. Furthermore, a title of the e-mail is set in advance to use a sentence of the first line in the text information included in the modification information composed by the modification information composition unit 27.

Figures 17, 18, 19:
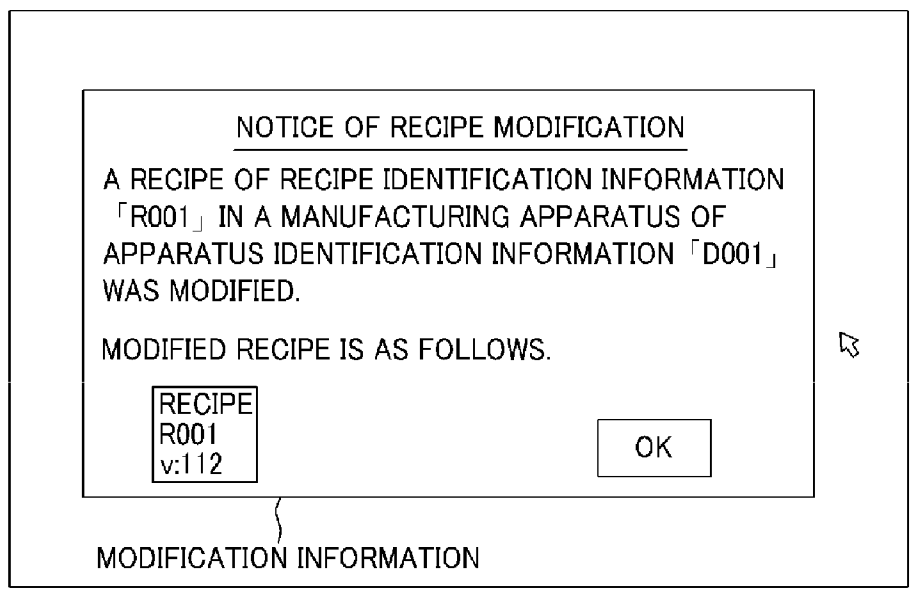
FIG. 17 is a view for showing an example of a corresponding relationship between apparatus identification information and an address in accordance with the embodiment of the present invention.
FIG. 18 is a view for showing an example of a display of modification information in accordance with the embodiment of the present invention.
FIG. 19 is a view for showing an example of transmission destination information stored in a transmission destination information storage unit in accordance with the embodiment of the present invention.

Furthermore, the modification information transmitting unit 30 stores, in a non-illustrated storage medium, the apparatus identification information and the address corresponding to each other as illustrated in FIG. 17, and acquires addresses corresponding to the transmission destination information ⌈C0011 and ⌈D001⌋ by using such information. Then, the modification information transmitting unit 30 transmits the modification information including the text information illustrated in FIG. 14 and the recipe R001 to each address as the transmission destination. In this way, the modification information is transmitted by the modification information transmitting unit 30 (step S208).

Further, since a process of receiving an e-mail has been well known, there is omitted an explanation about a process of receiving the e-mail illustrated in FIG. 16 by a user corresponding to the e-mail address ⌈user001@tel . . . com⌋ by using an information terminal device or the like. Meanwhile, the user becomes aware that the content of the recipe has been modified by viewing the e-mail illustrated in FIG. 16, and if the modification of the content of the recipe is not appropriate, the user can restore the modified content by transmitting the modification instruction from the client device 10 or the like to the manufacturing apparatus 40.

It is supposed that the apparatus identification information of the client device 10 in the group management system of FIG. 1 is ⌈C001⌋. Then, the modification information transmitted from the server device 20 is received by the modification information receiving unit 13 of the client device 10 (step S103). Further, the information showing a purport of notifying the modification of the content of the recipe shown in FIG. 18 is displayed on a display connected to the client device 10 (step S104). In this connection, if the user manipulates a mouse and clicks an icon of the recipe R001 on the display, a content of a recipe version 112 of the recipe R001 is displayed on the display. This display is viewed by the user of the client device 10 so that it is possible to call the user's attention to the modification of the content of the recipe. If the modification of the content of the recipe is not appropriate, the user can restore the modified content by transmitting the modification instruction again from the client device 10 to the manufacturing apparatus 40.

The modification information which is transmitted from the server device 20 to the manufacturing apparatus 40 identified by the apparatus identification information ⌈D001⌋ is received by the modification information receiving unit 47 of the manufacturing apparatus 40 (step S306). Then, the same display as illustrated in FIG. 18 is displayed and the red flashlight is operated, and thereby, it is possible to call the attention of a user of the manufacturing apparatus 40 to the modification of the content of the recipe (step S307). If the modification of the content of the recipe is not appropriate, the user can restore the modified content by operating an input device connected to the manufacturing apparatus 40.

Further, in this detailed example, a case where the transmission destination information is set for each recipe identification information in the transmission destination information storage unit 28 has be explained, but the transmission destination information stored in the transmission destination information storage unit 28 is not limited thereto. It is possible to set the transmission destination information in the transmission destination information storage unit 28, e.g., for each apparatus identification information of the manufacturing apparatus 40 as illustrated in FIG. 19; for each recipe identification information and each apparatus identification information as illustrated in FIG. 20; or regardless of the recipe identification information or the apparatus identification information. In addition, if the transmission destination information is set for each of the apparatus identification information, the transmission destination information acquisition unit 29 may acquire the transmission destination information by using, e.g., the apparatus identification information, which is transmitted together with the modified recipe, for identifying the manufacturing apparatus 40 in which the content of the recipe is modified.

Furthermore, in this detailed example, a case where the transmission destination information is an e-mail address or apparatus identification information has been explained, but the transmission destination information can be an IP address, a telephone number or an IEEE1394 address. In addition, the transmission destination information can be 「all the apparatuses」. In this case, the modification information transmitting unit 30 may transmit the modification information to all the apparatuses connected to a communication line by broadcast.

In addition, in this detailed example, a case where the modification information includes a modified recipe has been explained, but the modified information may include a difference between the non-modified recipe and the modified recipe, or only a purport of modifying the recipe. If the modification information including the difference between recipes is transmitted by e-mail, the e-mail shown in FIG. 21, for example, may be transmitted.

Besides, in this detailed example, as illustrated in FIG. 13, a case where the recipe for transmitting the modification information is decided in advance and the determination unit 26 determines whether or not the modification information needs to be transmitted according to such a decision, has been explained, but the determination unit 26 can also perform other determinations. For example, if the content of the recipe is not modified for a predetermined period (e.g., three months or the like) or more prior to modification, the determination unit 26 may determine the modification information to be transmitted, and in other cases, the determination unit 26 may determine the modification information not to be transmitted. For example, if the predetermined period is set to be three months and the recipe R001 is modified, the determination unit 26 may determine the modification information to be transmitted since a modification interval for the recipe R001 exceeds three months with reference to the recipe management information illustrated in FIG. 12. Further, in the recipe management information, for example, if a consecutive-use period indicating a period, during which the recipe is used without any modification, is contained, the determination unit 26 may determine whether or not the consecutive-use period exceeds the predetermined period. Therefore, it is possible to determine whether or not the content of the recipe is not modified for the predetermined period or more prior to the modification. In this way, if the recipe which has been used stably for a long time is modified, it is possible to call attention to a purport of the modification by transmitting the modification information. Meanwhile, even if the recipe is frequently modified in order to find an optimum recipe by trial and error, the modification information is not transmitted. Accordingly, it is possible to prevent modification information of low necessity from being transmitted, and also it is possible to prevent modification information of high necessity from being obscured by modification information of low necessity. Further, in this case, the modification information may include information indicating a period during which the recipe has been used consecutively without any modification. In this way, the user who views the modification information can recognize immediately how long the recipe has stably been used so that it is possible to easily determine whether or not the modification of the content of the recipe is appropriate.

Furthermore, if a content of a recipe stored in a predetermined folder is modified, for example, the determination unit 26 may determine the modification information to be transmitted, and if a content of a recipe stored in other folder is modified, the determination unit may determine the modification information not to be transmitted. In addition, if a content of a recipe in a predetermined manufacturing apparatus 40 is modified, for example, the determination unit 26 may determine the modification information to be transmitted, and if a content of a recipe in other manufacturing apparatus 40 is modified, the determination unit 26 may determine the modification information not to be transmitted.

If the determination unit 26 determines whether or not the modification information is to be transmitted according to whether or not a predetermined condition is satisfied, the predetermined condition may be stored in a storage medium accessible by the determination unit 26. The storage medium may be included in the determination unit 26 for example.

As stated above, in accordance with the group management system of the present embodiment, if the content of the recipe retained in the manufacturing apparatus 40 is modified, the modification information related to such a modification can be transmitted. Further, according to the modification information, the user can be aware that the content of the recipe has been modified and thus can determine whether or not the modification is appropriate. As a result, if the modification is not appropriate, it is possible to restore the content of the recipe or modify it again. In this way, it is possible to prevent the content of the recipe from being modified carelessly, and thereby it is possible to prevent an occurrence of a lot-out or the like caused by such a careless modification.

Furthermore, since the modification information is transmitted based on the determination result made by the determination unit 26, it is possible to prevent unnecessary modification information or modification information of low necessity from being transmitted.

Besides, if the modification information includes the modified recipe or a difference between the recipes, the user can be aware of what has been modified in the content of the recipe based on the modification information so that the user does not have to access the server device 20 or the manufacturing apparatus 40 in order to acquire the modified content of the recipe. Therefore, user convenience can be enhanced.

Second Embodiment

A group management system in accordance of the second embodiment of the present invention will be explained with reference to the accompanying drawings. In the group management system in accordance with the present embodiment, a server device acquires difference/sameness information indicating whether a newest recipe received by the recipe receiving unit and a just-previous recipe are different or not and then transmits modification information if there is found a difference between the recipes based on the difference/sameness information.

Figure 22:
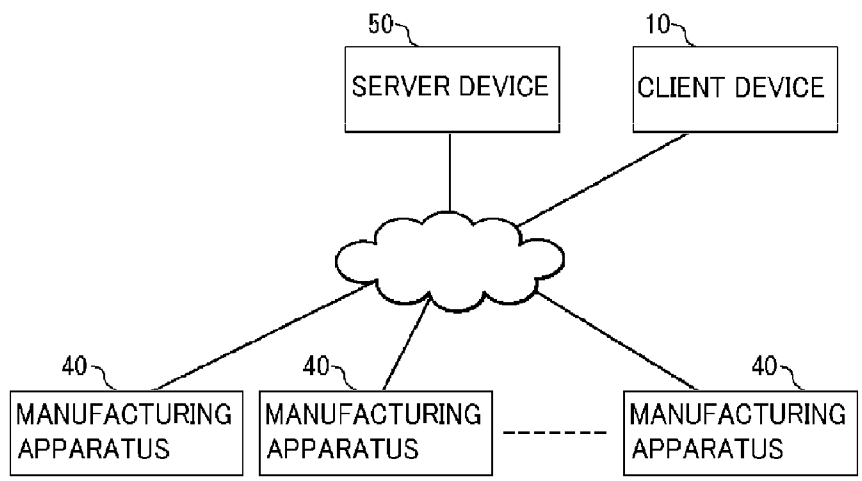
FIG. 22 is a block diagram showing a configuration of a group management system in accordance with a second embodiment of the present invention.

FIG. 22 is a block diagram showing a configuration of the group management system in accordance with the present embodiment. As illustrated in FIG. 22, the group management system in accordance with the present embodiment includes a client device 10, a server device 50 and N manufacturing apparatuses. Here, N refers to an integer of 1 or more. Except the server device 50, the components and operations of the group management system are the same as those described in the first embodiment. Therefore, a detailed explanation thereof will be omitted.

Figure 23:
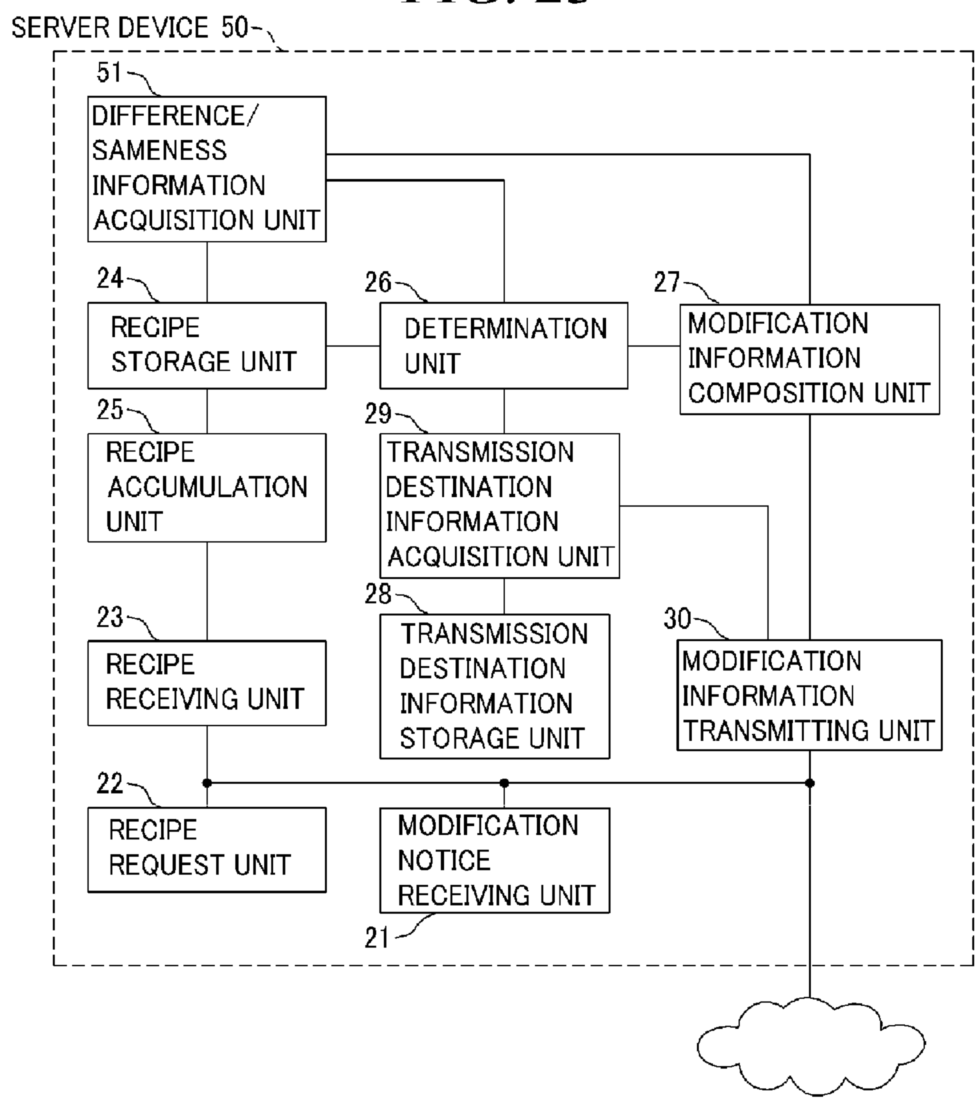
FIG. 23 is a block diagram showing a configuration of a server device in accordance with the embodiment of the present invention.

FIG. 23 is a block diagram showing a configuration of the server device 50 in accordance with the present embodiment. As illustrated in FIG. 23, the server device 50 in accordance with the present embodiment includes a modification notice receiving unit 21, a recipe request unit 22, a recipe receiving unit 23, a recipe storage unit 24, a recipe accumulation unit 25, a determination unit 26, a modification information composition unit 27, a transmission destination information storage unit 28, a transmission destination information acquisition unit 29, a modification information transmitting unit 30 and a difference/sameness information acquisition unit 51. Further, the components and operations except for the difference/sameness information acquisition unit 51 are the same as those described in the first embodiment, excepting that the modification information transmitting unit 30 transmits the modification information in case there is found a difference between two target recipes based on the difference/sameness information acquired by the difference/sameness information acquisition unit 51 and does not transmit the modification information in case there is not found any difference between the two compared recipes based on the difference/sameness information. Therefore, a detailed explanation thereof will be omitted.

If there is not found any difference between the two compared recipes based on the difference/sameness information, the modification information transmitting unit 30 may not transmit the modification information in the end. For example, if there is not found any difference between the two compared recipes according to the difference/sameness information, the modification information composition unit 27 may not compose the modification information; the transmission destination information acquisition unit 29 may not acquire transmission destination information so that the modification information transmitting unit 30 may not transmit the modification information. Alternatively, even if the modification information composition unit 27 composes the modification information and the transmission destination information acquisition unit 29 acquires the transmission destination information, the modification information transmitting unit 30 may not transmit such modification information. In the present embodiment, there will be explained a case where if there is not found any difference between the two compared recipes based on the difference/sameness information, the determination unit 26 does not perform a determination so that the modification information is not composed and the transmission destination information is not acquired and thus the modification information is not transmitted. Furthermore, even if there is found a difference between the two compared recipes according to the difference/sameness information, there is an instance where the modification information is not transmitted for other reasons. For example, the modification information will not be transmitted if the determination unit 26 explained in the first embodiment determines that the modification information is not to be transmitted.

Further, in the present embodiment, a recipe received by the recipe receiving unit 23 can be a recipe of the manufacturing apparatus 40 in which a content of the recipe has been modified or a recipe of the manufacturing apparatus 40 in which a content of the recipe has not been modified.

The difference/sameness information acquisition unit compares the newest recipe received by the recipe receiving unit 23 with a recipe which is stored in the recipe storage unit 24 and is a recipe of the manufacturing apparatus 40 in which the newest recipe is used, and acquires difference/sameness information indicating whether such two recipes are different or not. Here, the recipe, serving as a target in comparison, stored in the recipe storage unit 24 is a recipe closest in time to the newest recipe received by the recipe receiving unit 23. Therefore, the difference/sameness information acquisition unit 51 compares the newest recipe with such a closest recipe. Further, the difference/sameness information may include, e.g., information indicating whether two recipes are different or not, or information indicating a difference between the two recipes if there is found any difference between the two recipes.

Furthermore, the difference/sameness information acquisition unit 51 may compare information related to setup of the manufacturing apparatus 40 in the two recipes and acquire difference/sameness information indicating whether the information related to the setup of the manufacturing apparatus 40 is different or not. The information related to the setup of the manufacturing apparatus 40 can be included in, e.g., the body of the recipe explained in the first embodiment. Since the body of the recipe generally includes steps, the information upon the setup of the manufacturing apparatus 40 may be related to a step included in the recipe. The difference/sameness information acquisition unit 51 may compare respective steps included in two recipes and then acquire difference/sameness information indicating whether the respective steps are different or not.

In addition, the difference/sameness information acquisition unit 51 may compare information related to recipe management of the two recipes and acquire difference/sameness information indicating whether the information on the recipe management is different or not. The information on the recipe management can be included in, e.g., the header of the recipe explained in the first embodiment.

In case the difference/sameness information acquired by the difference/sameness information acquisition unit 51 is information indicating whether the two recipes are different or not, the difference/sameness information can be, e.g., information including a graph showing a difference/sameness of the two recipes. Meanwhile, in case the difference/sameness information is information showing a difference between the two recipes, the difference/sameness information can be, e.g., information such as the last two lines of the modification information illustrated in FIG. 21. A method for obtaining a difference between two pieces of information has been well known so that a detailed explanation thereof will be omitted.

Further, the modification information composition unit may compose modification information including the difference/sameness information acquired by the difference/sameness information acquisition unit 51.

Figure 24:
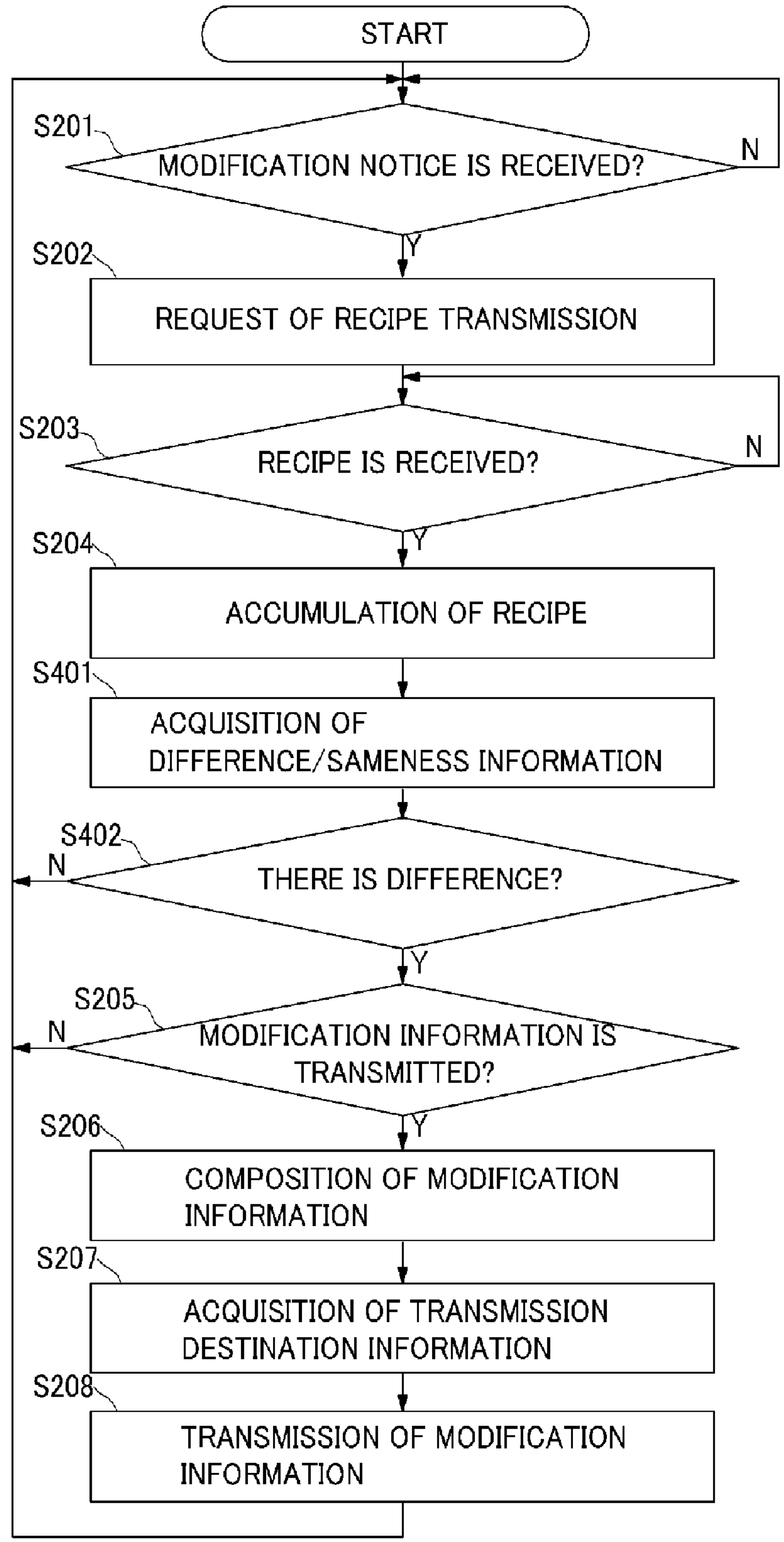
FIG. 24 is a flow chart showing an operation of a server device in accordance with the embodiment of the present invention.

FIG. 24 is a flow chart showing an operation of the server device 50 in accordance with the present embodiment. Here, except step S401 and step S402, the processes shown in FIG. 24 is the same as those described in the flow chart in FIG. 7 of the first embodiment. Therefore, a detailed explanation thereof will be omitted.

(Step S401) The difference/sameness information acquisition unit 51 compares a newest recipe received by the recipe receiving unit 23, i.e., a newest recipe stored in the recipe storage unit 24 with a recipe, closest in time to the newest recipe, which is stored in the recipe storage unit 24 and is a recipe of the manufacturing apparatus 40 in which the newest recipe is used. Then, the difference/sameness information acquisition unit 51 acquires difference/sameness information indicating whether the two recipes are different or not.

(Step S402) The determination unit 26 determines whether or not there is any difference between the two recipes according to the difference/sameness information. Then, if there is found a difference, the process proceeds to step S205; otherwise, the process returns to step S201.

Further, in the present embodiment, a case where whether or not there is found a difference between the two recipes according to the difference/sameness information is determined by the determination unit 26 has been explained, but as stated above, as long as there is not found any difference and the modification information is not transmitted in the end, any other component may perform such a determination instead. For example, the modification information transmitting unit 30 may perform such a determination.

Further, the operations of the group management system in accordance with the present embodiment are the same as those described in the first embodiment, excepting that difference/sameness information on the recipes is acquired and the modification information is transmitted according to the acquired difference/sameness information. Therefore, a detailed explanation thereof will be omitted.

As stated above, the group management system in accordance with the present embodiment, besides the effects described in the first embodiment, is effective in that if there is not found any difference between the two recipes according to the difference/sameness information, the modification information is not transmitted, and only if a content of the recipe is modified, the modification information can be transmitted. As a result, it is possible to prevent unnecessary modification information from being transmitted.

Furthermore, in the present embodiment, a case where the server device 50 requests that recipes be transmitted in response to receipt of a modification notice and acquires difference/sameness information on the recipes received pursuant to the request has been explained. Therefore, as long as there is no modification in the content of the recipe by modifying some values in the recipe and restoring the modified values, it is deemed that a content of the newest recipe becomes different from that of the just-previous recipe. However, if the server device 50, e.g., periodically receives a recipe of the manufacturing apparatus 40 regardless of the modification notice, as explained in the present embodiment, it is very efficient that after acquiring the difference/sameness information, the modification information is transmitted according to the acquired difference/sameness information.

Third Embodiment

A group management system in accordance with a third embodiment of the present invention will be explained with reference to the accompanying drawings. In the group management system in accordance with the present embodiment, a server device acquires difference/sameness information indicating whether a newest recipe received by the recipe receiving unit and a master recipe are different or not and then transmits modification information if there is found a difference between the two recipes according to the difference/sameness information. The components and operations of the server device in accordance with the present embodiment are about the same as those described in the second embodiment excepting that a recipe as a comparison target is the master recipe.

Figure 25:
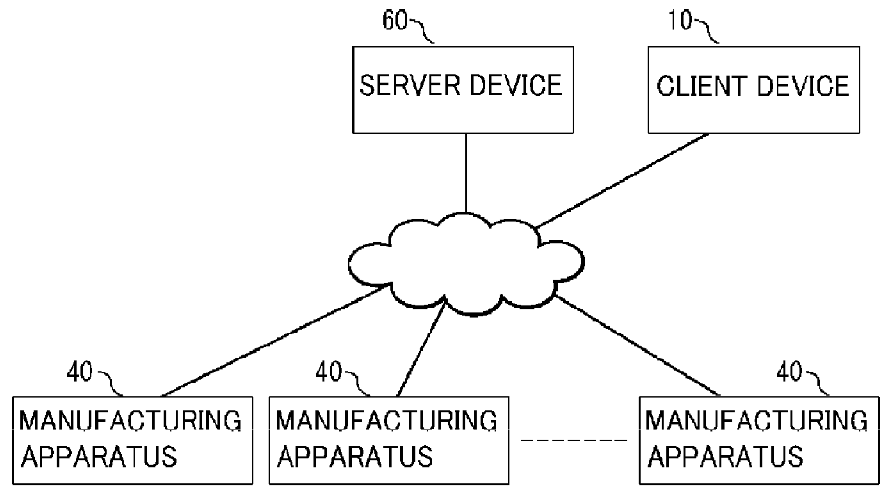
FIG. 25 is a block diagram showing a configuration of a group management system in accordance with a third embodiment of the present invention.

FIG. 25 is a block diagram showing a configuration of the group management system in accordance with the present embodiment. As illustrated in FIG. 25, the group management system in accordance with the present embodiment includes a client device 10, a server device 60 and N manufacturing apparatuses 40. Here, N refers to an integer of 1 or more. Except the server device 60, the components and operations of the group management system are the same as those described in the first embodiment. Therefore, a detailed explanation thereof will be omitted.

Figure 26:
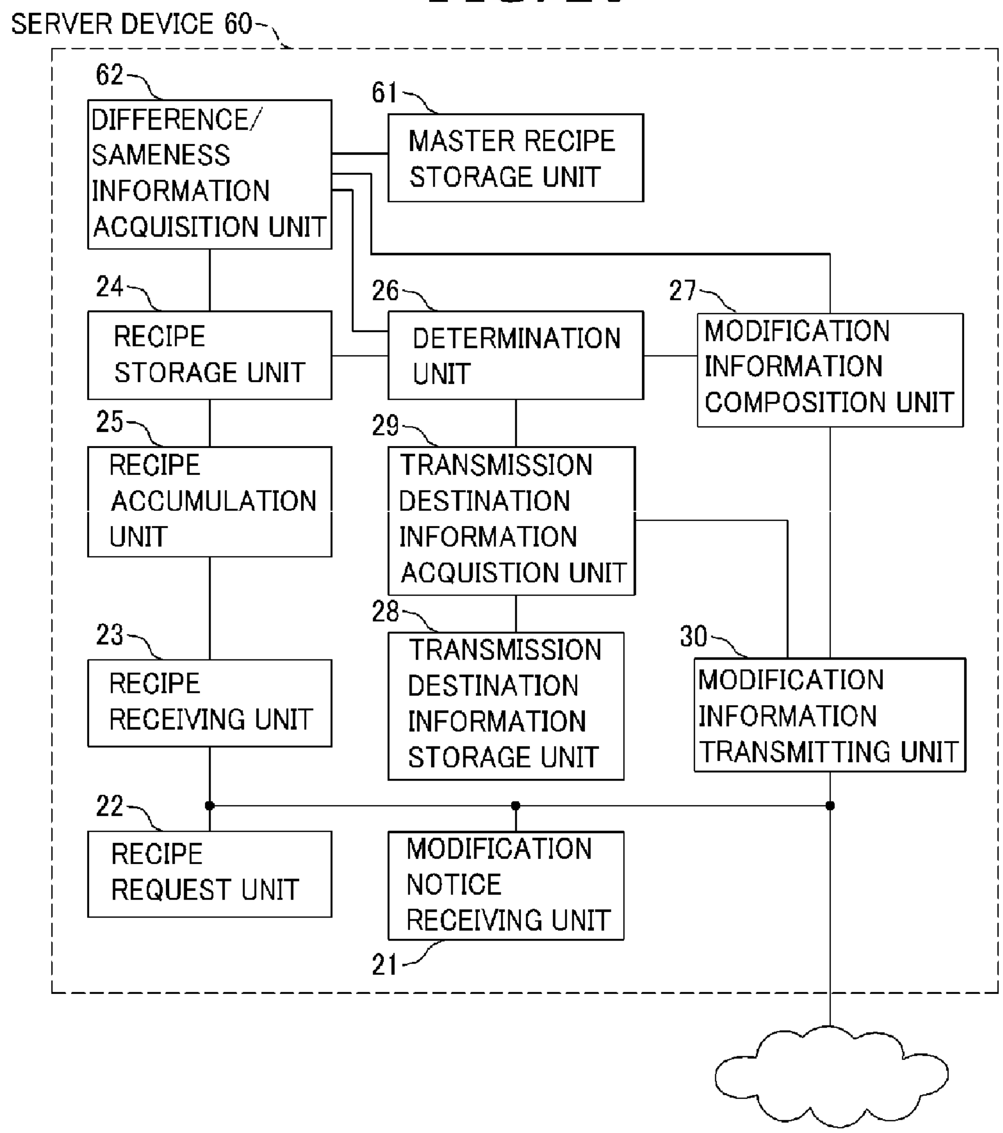
FIG. 26 is a block diagram showing a configuration of a server device in accordance with the embodiment of the present invention.

FIG. 26 is a block diagram showing a configuration of the server device 60 in accordance with the present embodiment. As illustrated in FIG. 26, the server device 60 in accordance with the present embodiment includes a modification notice receiving unit 21, a recipe request unit 22, a recipe receiving unit 23, a recipe storage unit 24, a recipe accumulation unit 25, a determination unit 26, a modification information composition unit 27, a transmission destination information storage unit 28, a transmission destination information acquisition unit 29, a modification information transmitting unit 30, a master recipe storage unit 61, and a difference/sameness information acquisition unit 62. Further, the components and operations except the master recipe storage unit 61 and difference/sameness information acquisition unit 62 are the same as those described in the first embodiment, excepting that the modification information transmitting unit 30 transmits the modification information in case there is found a difference between two compared recipes according to the difference/sameness information acquired by the difference/sameness information acquisition unit 62 and does not transmit the modification information in case there is not found any difference between the two compared recipes based on the difference/sameness information. Therefore, a detailed explanation thereof will be omitted.

In addition, in case there is not found any difference between the two compared recipes based on the difference/sameness information, the modification information transmitting unit 30 may not transmit the modification information in the end. For example, if there is found no difference between the two compared recipes based on the difference/sameness information, the modification information composition unit 27 may not compose the modification information; or the transmission destination information acquisition unit 29 may not acquire transmission destination information, so that the modification information transmitting unit 30 may not transmit the modification information. Alternatively, even if the modification information composition unit 27 composes the modification information and the transmission destination information acquisition unit 29 acquires the transmission destination information, the modification information transmitting unit 30 may not transmit such modification information. In the present embodiment, there will be explained a case where if there is not found any difference between the two compared recipes, the determination unit 26 does not perform a determination so that the modification information is not composed and the transmission destination information is not acquired and thus the modification information is not transmitted. Furthermore, even if there is found a difference between the two compared recipes based on the difference/sameness information, there may be an instance where the modification information is not transmitted for other reasons. For example, the modification information will not be transmitted if the determination unit 26 explained in the first embodiment determines that the modification information is not to be transmitted.

Further, in the present embodiment, a recipe received by the recipe receiving unit 23 can be a recipe of the manufacturing apparatus 40 in which a content of the recipe has been modified or a recipe of the manufacturing apparatus 40 in which a content of the recipe has not been modified.

The master recipe storage unit 61 stores therein the master recipe. Here, the master recipe serves as a reference recipe. For example, if the same recipe is used in two or more manufacturing apparatuses 40, its reference recipe is the master recipe which may be stored in the master recipe storage unit 61. The master recipe storage unit 61 may store therein a single master recipe, or two or more master recipe for each of the manufacturing apparatuses 40 or for each of groups of the manufacturing apparatuses 40. The master recipe storage unit 61 can be embodied by a predetermined storage medium (e.g., a semiconductor memory, a magnetic disc, an optical disc or the like). There is no limitation on a process of storing the master recipe in the master recipe storage unit 61. It may be possible to store the master recipe in the master recipe storage unit 61 by using, e.g., a storage medium; to store the master recipe received via a communication line in the master recipe storage unit 61; or to store the master recipe inputted through an input device in the master recipe storage unit 61. In addition, it may be possible for a non-illustrated unit to modify the master recipe stored in the master recipe storage unit 61.

Besides, two or more storage units among the recipe storage unit 24, the transmission destination information storage unit 28 and the master recipe storage unit 61 can be embodied in the same storage medium or in separate storage media.

The difference/sameness information acquisition unit 62 compares a newest recipe received by the recipe receiving unit 23 with a master recipe stored in the master recipe storage unit 61 and acquires difference/sameness information indicating whether the two recipes are different or not. Here, the master recipe serving as a comparison target is a master recipe corresponding to the manufacturing apparatus in which the newest recipe received by the recipe receiving unit 23 is used. Further, the difference/sameness information may include, e.g., information indicating whether the two recipes are different or not, or information showing a difference if there is found the difference between the two recipes.

Furthermore, the difference/sameness information acquisition unit 62 may compare information related to setup of the manufacturing apparatus 40 in the two recipes and acquire difference/sameness information indicating whether the information related to the setup of the manufacturing apparatus 40 is different or not. The information related to the setup of the manufacturing apparatus 40 can be included in, e.g., the body of the recipe explained in the first embodiment. The body of the recipe generally includes steps, and the information related to the setup of the manufacturing apparatus 40 relates to a step included in the recipe. The difference/sameness information acquisition unit 62 may compare respective steps included in two recipes and then acquire difference/sameness information indicating whether the respective steps are different or not.

In addition, the difference/sameness information acquisition unit 62 may compare information upon recipe management in two recipes and acquire difference/sameness information indicating whether the information on the recipe management is different or not. The information related to the recipe management can be included in, e.g., the header of the recipe explained in the first embodiment. Further, the modification information composition unit 27 may compose modification information including the difference/sameness information acquired by the difference/sameness information acquisition unit 62.

Figure 27:
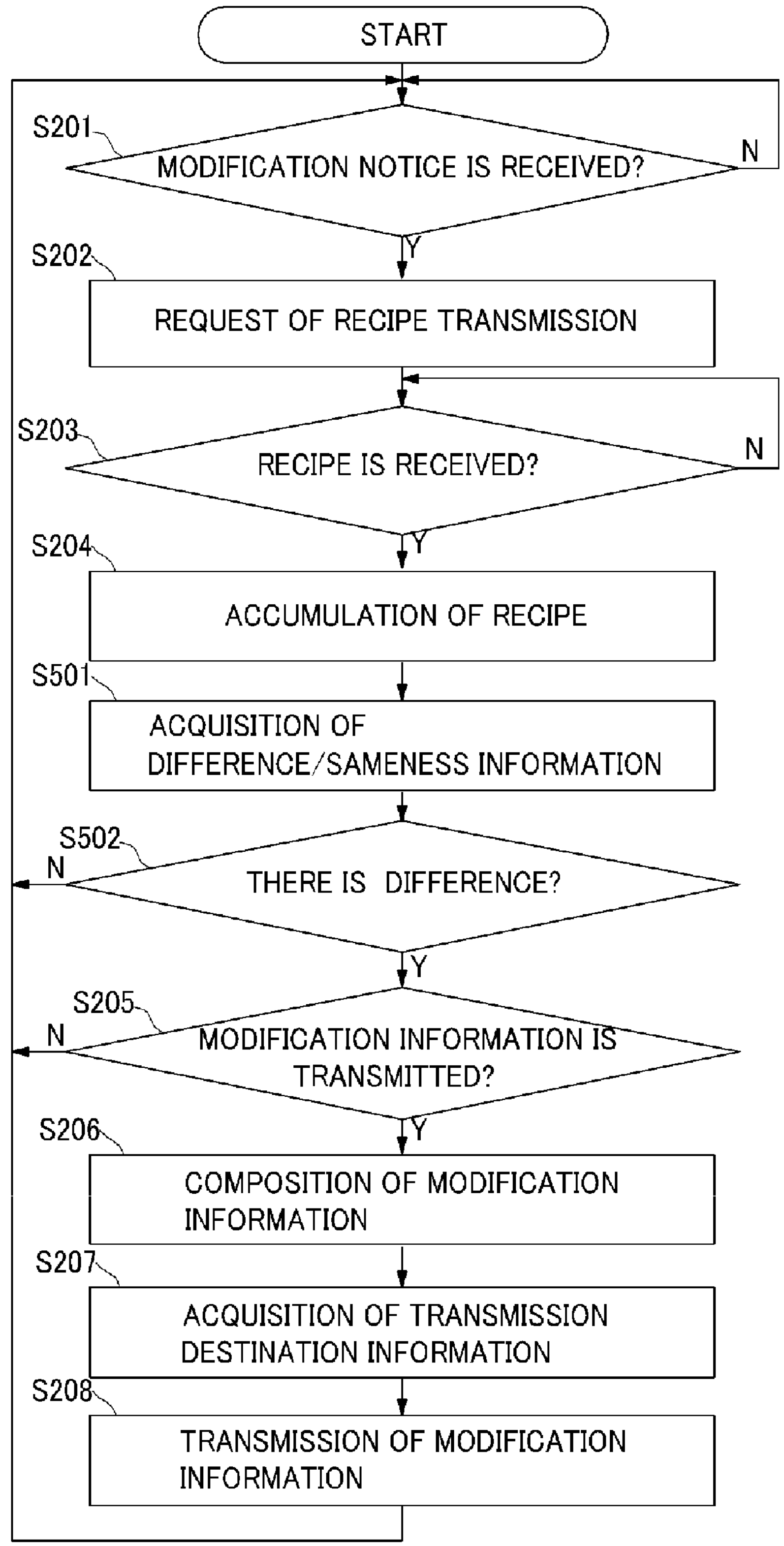
FIG. 27 is a flow chart showing an operation of a server device in accordance with the embodiment of the present invention.

FIG. 27 is a flow chart showing an operation of the server device 60 in accordance with the present embodiment. Here, except step S501 and step S502, processes shown in FIG. 27 is the same as those described in the flow chart in FIG. 7 of the first embodiment. Therefore, a detailed explanation thereof will be omitted.

(Step S501) The difference/sameness information acquisition unit 62 compares a newest recipe received by the recipe receiving unit 23, i.e., a newest recipe stored in the recipe storage unit 24 with a master recipe stored in the master recipe storage unit 61. Then, the difference/sameness information acquisition unit 62 acquires difference/sameness information indicating whether the two recipes are different or not.

(Step S502) The determination unit 26 determines whether or not there is any difference between the two recipes based on the difference/sameness information. Then, if there is found a difference, the process proceeds to step S205; otherwise, the process returns to step S201.

Further, in the present embodiment, a case where the determination unit 26 determines whether or not there is found a difference between the two recipes based on the difference/sameness information has been explained, but as stated above, as long as there is found no difference and the modification information is not transmitted in the end, any other component may perform such a determination instead. For example, the modification information transmitting unit 30 may perform such a determination.

In addition, the operations of the group management system in accordance with the present embodiment are the same as those described in the first embodiment, excepting that the difference/sameness information on the recipes is acquired and the modification information is transmitted according to the acquired difference/sameness information. Therefore, a detailed explanation thereof will be omitted. Further, as stated in the present embodiment, since it is possible that a plurality of manufacturing apparatuses 40 have the same master recipe, a difference between the recipes of the plurality of manufacturing apparatuses 40 may be checked in the group management system.

As stated above, the group management system in accordance with the present embodiment, besides the effects described in the first embodiment, is effective in that if there is not found any difference between the two recipes according to the difference/sameness information, the modification information is not transmitted, and only if the recipe used in the manufacturing apparatus 40 has a difference from the master recipe, the modification information can be transmitted. As a result, it is possible to prevent insignificant modification information from being transmitted.

Further, in the present embodiment, a case where the server device 60 requests recipes to be transmitted in response to receipt of a modification notice and acquires difference/sameness information on the recipes received pursuant to the request has been explained. However, the server device 60 may receive a recipe of the manufacturing apparatus 40, e.g., periodically regardless of the modification notice.

In addition, the server device 20, 50 or 60 of the group management system in accordance with the above-stated embodiments, as illustrated in FIG. 4 and the like, may perform only a recipe management. Therefore, it may be possible to install another server device for performing other processes in the group management system such as performing a process pursuant to the request of the client device 10 and transmitting a result of the process to the client device 10, or accumulating various kinds of measurement information transmitted from one or more manufacturing apparatuses 40, in addition to the server device 20, 50 or 60.

Further, the client device 10, the server device 20, 50 or 60 and the manufacturing apparatus 40 included in the group management system in accordance with the above-stated embodiments may include other components in addition to the components described in the present embodiment, of course.

Furthermore, in each embodiment, there has been explained a case where if a recipe retained in the manufacturing apparatus 40 is modified, the modification notice containing a purport of the modification is transmitted to the server device 20, 50 or 60 and in response to the receipt of the modification notice, the server device 20, 50 or 60 makes a request, which contains a purport of transmitting the modified recipe, to the manufacturing apparatus 40 and pursuant to such a request, the modified recipe is transmitted from the manufacturing apparatus 40 to the server device 20, 50 or 60. However, a method of receiving the modified recipe by the server device 20, 50 or 60 is not limited thereto. For example, if the recipe retained in the manufacturing apparatus 40 is modified, the modified recipe can be transmitted to the server device 20, 50 or 60; regardless of whether or not a content of the recipe is modified, the recipe can be transmitted periodically from the manufacturing apparatus 40 to the server device 20, 50 or 60; and regardless of whether or not a content of the recipe is modified, the server device 20, 50 or 60 may periodically make a request, which contains a purport of transmitting the recipe, to the manufacturing apparatus 40. In case the recipe is transmitted from the manufacturing apparatus 40 to the server device 20, 50 or 60 regardless of whether or not a content of the recipe is modified, only if a content of the recipe is modified, the recipe accumulation unit 25 may accumulate the modified recipe in the recipe storage unit 24. Further, as stated in the second and third embodiments, by acquiring the difference/sameness information, it may be possible to determine whether or not the content of the recipe has been modified. Even if the recipe is transmitted from the manufacturing apparatus 40 to the server device 20, 50 or 60 regardless of whether or not the content of the recipe is modified, in case the recipe retained in the manufacturing apparatus 40 is modified, the modified recipe may be transmitted. Therefore, in case the content of the recipe retained in the manufacturing apparatuses 40 is modified, the recipe receiving unit 23 can receive the modified recipe. Furthermore, if the server device 20, 50 or 60 does not have to make a request containing a purport of transmitting the modified recipe, the server device 20, 50 or 60 may not include the modification notice receiving unit 21 and the recipe request unit 22.

In addition, in each embodiment, there has been explained a case where the server device 20, 50 or 60 includes the determination unit 26 and the modification information transmitting unit 30 transmits the modification information based on a determination result of the determination unit 26. However, the server device 20, 50 or 60 may not include the determination unit 26. In this case, if a content of a recipe is modified, the modification information is transmitted. Further, if the recipe receiving unit 23 receives only the modified recipe, the modification information is transmitted when the modified recipe is received. Meanwhile, if the recipe receiving unit 23 receives a recipe regardless of whether or not the recipe is modified, as stated in the second embodiment, it may be possible to determine whether the received recipe has been modified, or as stated in the third embodiment, it may be possible to determine whether or not the received recipe is the same as the master recipe. Such determination can be performed by comparing, e.g., a recipe stored in the recipe storage unit 24 with a recipe received by the recipe receiving unit 23. In the second and third embodiments, such determination can be performed by using the difference/sameness information. Further, such determination can be performed by, e.g. the modification information composition unit 27, the transmission destination information acquisition unit 29, the modification information transmitting unit 30, or the other components. In addition, if the received recipe has been modified or different from the master recipe, the modification information is transmitted.

Further, in case a single recipe is modified and two or more transmission destinations are set by the transmission destination information, it may be possible to transmit different modification information to each transmission destination. For example, to a transmission destination such as a user's cell phone, the modification information for simply notifying a purport of the modification of the recipe may be composed and transmitted, and to a transmission destination such as the client device 10, the manufacturing apparatus 40 or the like, the modification information including the modified recipe, a difference between the recipes or the like may be composed and transmitted.

Furthermore, in each embodiment, there is no limitation on an input source and transmission source of the modification instruction received by the modification instruction receiving unit 42 of the manufacturing apparatus 40. For example, it may be possible to transmit the modification instruction from the server device 20, 50 or 60 to the manufacturing apparatus 40, or it may be possible to transmit the modification instruction from another device other than components shown in FIG. 1 to the manufacturing apparatus 40.

Furthermore, in each embodiment, there is no limitation on a transmission destination of the modification information transmitted by the server device 20, 50 or 60. For example, the server device 20, 50 or 60 may transmit the modification information to another device other than components shown in FIGS. 1, 22 and 25.

In addition, in each embodiment, there has been explained a case where the recipe includes, e.g., the header and the body. However, in the group management system of each embodiment, the transmitted/received recipe may have only the body or may be formed in other forms. The form of the recipe is not limited to the examples described in each embodiment.

Further, in each embodiment, each process or each function can be implemented by centralized processing in a single device or a single system, or can be implemented by distributed processing in a plurality of devices or systems.

Further, in each embodiment, each of the components can be embodied by a dedicated hardware, and as for the components executable by software, they can be implemented by executing a program. Each of the components can be implemented by reading and executing a software program stored in a storage medium such as a hard disc, a semiconductor memory, or the like by a program execution unit such as a CPU or the like. Here, the software for embodying the server device in each embodiment is the following program. That is, a program, to be executed in a server device connected with one or more manufacturing apparatuses for performing a predetermined semiconductor process on a target substrate, executes on a computer: a recipe receiving process for receiving a modified recipe if a content of a recipe of the manufacturing apparatus is modified; a recipe accumulating process for accumulating the recipe, received in the recipe receiving process, in a recipe storage unit in which at least a recipe used in the one or more manufacturing apparatuses is stored; a modification information composing process for composing modification information related to a modification of the content of the recipe; a transmission destination information acquiring process for acquiring transmission destination information from a transmission destination information storage unit in which the transmission destination information indicating a transmission destination of the modification information is stored; and a modification information transmitting process for transmitting the modification information composed in the modification information composing process to the transmission destination indicated by the transmission destination information acquired in the transmission destination information acquiring process.

Further, another program, to be executed in a server device connected with one or more manufacturing apparatuses for performing a predetermined semiconductor process on a target substrate, executes on a computer: a recipe receiving process for receiving a recipe of the manufacturing apparatus; a recipe accumulating process for accumulating the recipe, received in the recipe receiving process, in a recipe storage unit in which at least a recipe used in the one or more manufacturing apparatuses is stored; a modification information composing process for composing modification information related to a modification of the content of the recipe; a transmission destination information acquiring process for acquiring transmission destination information from a transmission destination information storage unit in which the transmission destination information indicating a transmission destination of the modification information is stored; a difference/sameness information acquiring process for comparing a newest recipe received in the recipe receiving process with a recipe, closest in time to the newest recipe, which is stored in the recipe storage unit and is a recipe of the manufacturing apparatus in which the newest recipe is used, and acquiring difference/sameness information indicating whether the two recipes are different or not; and a modification information transmitting process for transmitting the modification information composed in the modification information composing process to the transmission destination indicated by the transmission destination information acquired in the transmission destination information acquiring process if there is found a difference between the two recipes based on the difference/sameness information acquired in the difference/sameness information acquiring process.

Furthermore, still another program, to be executed in a server device connected with one or more manufacturing apparatuses for performing a predetermined semiconductor process on a target substrate, executes on a computer: a recipe receiving process for receiving a recipe of the manufacturing apparatus; a recipe accumulating process for accumulating the recipe, received in the recipe receiving process, in a recipe storage unit in which at least a recipe used in the one or more manufacturing apparatuses is stored; a modification information composing process for composing modification information related to a modification of the content of the recipe; a transmission destination information acquiring process for acquiring transmission destination information from a transmission destination information storage unit in which the transmission destination information indicating a transmission destination of the modification information is stored; a difference/sameness information acquiring process for comparing a newest recipe received in the recipe receiving process with a master recipe serving as a reference recipe and stored in a master recipe storage unit and acquiring difference/sameness information indicating whether the two recipes are different or not; and a modification information transmitting process for transmitting the modification information composed in the modification information composing process to the transmission destination indicated by the transmission destination information acquired in the transmission destination information acquiring process if there is found a difference between the two recipes based on the difference/sameness information acquired in the difference/sameness information acquiring process.

Further, in the information transmitting step or the information receiving step, a process executed by hardware, for example, a process executed by a modem, an interface card or the like (a process executed only by hardware) in the transmitting step is not included in the above-mentioned program.

In addition, it may be possible to execute the program by downloading it from a server or reading it from a predetermined storage medium (e.g., an optical disc such as a CD-ROM, a magnetic disc, a semiconductor memory, or the like).

Further, one or more computers can be used to execute the program. That is, centralized processing or distributed processing can be performed.

The present invention is not limited to the above-mentioned embodiments and can be modified in various ways, and it shall be understood that all the modifications are included in the scope of the present invention.

INDUSTRIAL APPLICABILITY

As stated above, the server device in accordance with the present invention is useful as a server device in a group management system including one or more manufacturing apparatuses for calling attention to a modification in case a content of a recipe is modified, thereby preventing an occurrence of a lot-out or the like caused by a careless modification of the content of the recipe.

What is claimed is:

1. A server device included in a group management system, which includes one or more manufacturing apparatuses for performing a predetermined semiconductor process on a target substrate and the server device connected with the one or more manufacturing apparatuses, the server device comprising:

a recipe storage unit for storing therein at least a recipe used in the one or more manufacturing apparatuses;

a recipe receiving unit for receiving a modified recipe if a content of the recipe of the manufacturing apparatus is modified;

a recipe accumulation unit for accumulating the recipe received by the recipe receiving unit in the recipe storage unit;

a modification information composition unit for composing modification information related to a modification of the content of the recipe by comparing a non-modified recipe stored in the recipe storage unit with the modified recipe received by the recipe receiving unit;

a transmission destination information storage unit for storing therein transmission destination information indicating at least one transmission destination of the modification information;

a transmission destination information acquisition unit for acquiring the transmission destination information from the transmission destination information storage unit; and a modification information transmitting unit for transmitting the modification information composed by the modification information composition unit to the transmission destination indicated by the transmission destination information acquired by the transmission destination information acquisition unit.

2. The server device of claim 1, wherein the modification information composition unit composes the modification information containing a purport of the modification of the content of the recipe.

3. The server device of claim 1, wherein the modification information composition unit composes the modification information including the modified recipe received by the recipe receiving unit.

4. The server device of claim 1, wherein the modification information composition unit obtains a difference between the non-modified recipe stored in the recipe storage unit and the modified recipe received by the recipe receiving unit and composes the modification information including the difference.

5. The server device of claim 1, wherein the modification of the content of the recipe is a modification of a content of information related to a setup of the manufacturing apparatus in the recipe.

6. The server device of claim 1, wherein the modification of the content of the recipe is a modification of a content of information related to a recipe management.

7. The server device of claim 1, further comprising:

a determination unit for determining whether or not the modification information needs to be transmitted, wherein the modification information transmitting unit transmits the modification information based on a determination result made by the determination unit.

8. The server device of claim 7, wherein the determination unit determines that the modification information needs to be transmitted on the condition that the newest recipe received by the recipe receiving unit satisfies a predetermined condition.

9. The server device of claim 8, wherein the predetermined condition implies a case in which it is set that the modification information is to be transmitted with respect to the newest recipe received by the recipe receiving unit.

10. The server device of claim 8, wherein the predetermined condition implies a case in which modification has not been made for a predetermined period or more with respect to the newest recipe received by the recipe receiving unit.

11. The server device of claim 1, wherein the transmission destination information is set for each recipe, and the transmission destination information acquisition unit acquires the transmission destination information corresponding to a newest recipe received by the recipe receiving unit.

12. The server device of claim 1, wherein the transmission destination information is set for each manufacturing apparatus, and the transmission destination information acquisition unit acquires the transmission destination information corresponding to the manufacturing apparatus in which a newest recipe received by the recipe receiving unit is used.

13. A server device included in a group management system, which includes one or more manufacturing apparatuses for performing a predetermined semiconductor process on a target substrate and the server device connected with the one or more manufacturing apparatuses, the server device comprising:

a recipe storage unit for storing therein at least a recipe used in the one or more manufacturing apparatuses;

a recipe receiving unit for receiving the recipe of the manufacturing apparatus;

a recipe accumulation unit for accumulating the recipe received by the recipe receiving unit in the recipe storage unit;

a modification information composition unit for composing modification information related to a modification of a content of the recipe;

a transmission destination information storage unit for storing therein transmission destination information indicating at least one transmission destination of the modification information;

a transmission destination information acquisition unit for acquiring the transmission destination information from the transmission destination information storage unit;

a difference/sameness information acquisition unit for comparing a newest recipe received by the recipe receiving unit with a recipe, closest in time to the newest recipe, which is stored in the recipe storage unit and is a recipe of the manufacturing apparatus in which the newest recipe is used and acquiring difference/sameness information indicating whether the two recipes are different or not; and a modification information transmitting unit for transmitting the modification information composed by the modification information composition unit to the transmission destination indicated by the transmission destination information acquired by the transmission destination acquisition unit in response to a difference found between the two recipes based on the difference/sameness information acquired by the difference/sameness information acquisition unit.

14. The server device of claim 13, wherein the difference/sameness information acquisition unit compares information related to setups of the manufacturing apparatus in the two recipes and acquires difference/sameness information indicating whether the information related to the setups of the manufacturing apparatus is different or not.

15. The server device of claim 14, wherein the information related to the setup of the manufacturing apparatus indicates a step included in the recipe, and the difference/sameness information acquisition unit acquires difference/sameness information indicating whether respective steps are different or not by comparing the respective steps included in the two recipes.

16. The server device of claim 13, wherein the difference/sameness information acquisition unit acquires difference/sameness information indicating whether information related to management of the two recipes is different or not by comparing the information related to the management of the two recipes.

17. The server device of claim 13, wherein the modification information composition unit composes the modification information including the difference/sameness information acquired by the difference/sameness information acquisition unit.

18. The server device of claim 13, wherein the modification information composition unit composes the modification information including the newest recipe received by the recipe receiving unit.

19. A server device included in a group management system, which includes one or more manufacturing apparatuses for performing a predetermined semiconductor process on a target substrate and the server device connected with the one or more manufacturing apparatuses, the server device comprising:

a recipe storage unit for storing therein at least a recipe used in the one or more manufacturing apparatuses;

a recipe receiving unit for receiving the recipe of the manufacturing apparatus;

a recipe accumulation unit for accumulating the recipe received by the recipe receiving unit in the recipe storage unit;

a master recipe storage unit for storing therein a master recipe serving as a reference recipe;

a modification information composition unit for composing modification information related to a modification of a content of the recipe;

a transmission destination information storage unit for storing therein transmission destination information indicating at least one transmission destination of the modification information;

a transmission destination information acquisition unit for acquiring the transmission destination information from the transmission destination information storage unit;

a difference/sameness information acquisition unit for acquiring difference/sameness information indicating whether two recipes are different or not by comparing a newest recipe received by the recipe receiving unit with the master recipe stored in the master recipe storage unit; and a modification information transmitting unit for transmitting the modification information composed by the modification information composition unit to the transmission destination indicated by the transmission destination information acquired by the transmission destination information acquisition unit in response to a difference found between the two recipes based on the difference/sameness information acquired by the difference/sameness information acquisition unit.

20. The server device of claim 19, wherein the difference/sameness information acquisition unit acquires difference/sameness information indicating whether information related to setups of the manufacturing apparatus is different or not by comparing the information related to the setups of the manufacturing apparatus in the two recipes.

21. The server device of claim 20, wherein the information related to the setup of the manufacturing apparatus indicates a step included in the recipe, and the difference/sameness information acquisition unit acquires difference/sameness information indicating whether respective steps are different or not by comparing the respective steps included in the two recipes.

22. The server device of claim 19, wherein the difference/sameness information acquisition unit acquires difference/sameness information indicating whether information related to management of the two recipes is different or not by comparing the information related to the management of the two recipes.

23. The server device of claim 19, wherein the modification information composition unit composes the modification information including the difference/sameness information acquired by the difference/sameness information acquisition unit.

24. The server device of claim 19, wherein the modification information composition unit composes the modification information including the newest recipe received by the recipe receiving unit.

25. An information processing method used in a server device connected with one or more manufacturing apparatuses for performing a predetermined semiconductor process on a target substrate, the method comprising:

a recipe receiving process for receiving a modified recipe if a content of a recipe in the manufacturing apparatus is modified;

a recipe accumulating process for accumulating the recipe, received in the recipe receiving process, in a recipe storage unit in which at least a recipe used in the one or more manufacturing apparatuses is stored;

a modification information composing process for composing modification information related to a modification of the content of the recipe by comparing a non-modified recipe stored in the recipe storage unit with the modified recipe received in the recipe receiving process;

a transmission destination information acquiring process for acquiring transmission destination information from a transmission destination information storage unit in which the transmission destination information indicating at least one transmission destination of the modification information is stored; and a modification information transmitting process for transmitting the modification information composed in the modification information composing process to the transmission destination indicated by the transmission destination information acquired in the transmission destination information acquiring process.

26. An information processing method used in a server device connected with one or more manufacturing apparatuses for performing a predetermined semiconductor process on a target substrate, the method comprising:

a recipe receiving process for receiving a recipe of the manufacturing apparatus;

a recipe accumulating process for accumulating the recipe, received in the recipe receiving process, in a recipe storage unit in which at least a recipe used in the one or more manufacturing apparatuses is stored;

a modification information composing process for composing modification information related to a modification of the content of the recipe;

a transmission destination information acquiring process for acquiring transmission destination information from a transmission destination information storage unit in which the transmission destination information indicating at least one transmission destination of the modification information is stored;

a difference/sameness information acquiring process for comparing a newest recipe received in the recipe receiving process with a recipe, closest in time to the newest recipe, which is stored in the recipe storage unit and is a recipe of the manufacturing apparatus in which the newest recipe is used, and acquiring difference/sameness information indicating whether two recipes are different or not; and a modification information transmitting process for transmitting the modification information composed in the modification information composing process to the transmission destination indicated by the transmission destination information acquired in the transmission destination information acquiring process in response to a difference found between the two recipes based on the difference/sameness information acquired in the difference/sameness information acquiring process.

27. An information processing method used in a server device connected with one or more manufacturing apparatuses for performing a predetermined semiconductor process on a target substrate, the method comprising:

a recipe receiving process for receiving a recipe of the manufacturing apparatus;

a recipe accumulating process for accumulating the recipe, received in the recipe receiving process, in a recipe storage unit in which at least a recipe used in the one or more manufacturing apparatuses is stored;

a modification information composing process for composing modification information related to a modification of the content of the recipe;

a transmission destination information acquiring process for acquiring transmission destination information from a transmission destination information storage unit in which the transmission destination information indicating at least one transmission destination of the modification information is stored;

a difference/sameness information acquiring process for comparing a newest recipe received in the recipe receiving process with a master recipe serving as a reference recipe and stored in a master recipe storage unit and acquiring difference/sameness information indicating whether the two recipes are different or not; and a modification information transmitting process for transmitting the modification information composed in the modification information composing process to the transmission destination indicated by the transmission destination information acquired in the transmission destination information acquiring process in response to a difference found between the two recipes based on the difference/sameness information acquired in the difference/sameness information acquiring process.

* * * * *

UNITED STATES PATENT AND TRADEMARK OFFICE

CERTIFICATE OF CORRECTION

PATENT NO. : 8,209,042 B2
APPLICATION NO. : 12/513414
DATED : June 26, 2012
INVENTOR(S) : Satoko Yamamoto It is certified that error appears in the above-identified patent and that said Letters Patent is hereby corrected as shown below:

In the specification, column 1, line 27, enter -- 2006-73845 -- after "No."

In the specification, column 8, line 27, replace "of" with -- af --

In the specification, column 13, line 47, insert -- 40 -- between "apparatus" and "in"

In the specification, column 15, line 37, insert -- 14 -- between "unit" and "out"

In the specification, column 16, line 44, insert -- 44 -- after "unit"

In the specification, column 17, line 45, insert -- 40 -- between "apparatus" and "identified"

In the specification, column 17, line 47, insert -- 3 -- between "step" and "of"

In the specification, column 17, line 58, insert -- 40 -- between "apparatus" and "identified"

In the specification, column 18, line 47, insert -- 25 -- between "unit" and "accumulates"

In the specification, column 19, line 61, replace "C0011" with -- C001 --

In the specification, column 23, line 48, insert -- 51 -- after "unit"

In the specification, column 27, line 14, insert -- 40 -- after "apparatus" and before "in"

Signed and Sealed this
Fourth Day of December, 2012

David J. Kappos

David J. Kappos
*Director of the United States Patent and Trademark Office*